United States Patent
Hamlet et al.

(10) Patent No.: US 8,667,265 B1
(45) Date of Patent: Mar. 4, 2014

(54) HARDWARE DEVICE BINDING AND MUTUAL AUTHENTICATION

(75) Inventors: Jason R. Hamlet, Albuquerque, NM (US); Lyndon G. Pierson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 557 days.

(21) Appl. No.: 12/908,131

(22) Filed: Oct. 20, 2010

Related U.S. Application Data

(63) Continuation-in-part of application No. 12/844,860, filed on Jul. 28, 2010.

(51) Int. Cl.
  *H04L 29/00* (2006.01)

(52) U.S. Cl.
  USPC ............................. 713/150; 713/185; 326/80

(58) Field of Classification Search
  USPC .................................... 713/150, 185; 326/80
  See application file for complete search history.

(56) References Cited

U.S. PATENT DOCUMENTS

| | | | |
|---|---|---|---|
| 7,370,190 B2 | 5/2008 | Calhoon et al. | |
| 7,681,103 B2 | 3/2010 | Devadas et al. | |
| 2003/0204743 A1 | 10/2003 | Devadas et al. | |
| 2006/0209584 A1 | 9/2006 | Devadas et al. | |
| 2006/0210082 A1 | 9/2006 | Devadas et al. | |
| 2006/0221686 A1 | 10/2006 | Devadas et al. | |
| 2006/0271792 A1 | 11/2006 | Devadas et al. | |
| 2006/0271793 A1 | 11/2006 | Devadas et al. | |
| 2007/0038871 A1 | 2/2007 | Kahlman et al. | |
| 2007/0044139 A1 | 2/2007 | Tuyls et al. | |
| 2007/0183194 A1 | 8/2007 | Devadas et al. | |
| 2008/0044027 A1 | 2/2008 | Van Dijk | |
| 2008/0059809 A1 | 3/2008 | Van Dijk | |
| 2009/0083833 A1 | 3/2009 | Ziola et al. | |
| 2009/0132828 A1 * | 5/2009 | Kiester et al. | 713/185 |
| 2009/0254981 A1 | 10/2009 | Devadas et al. | |
| 2011/0215829 A1 * | 9/2011 | Guajardo Merchan et al. | 326/8 |

OTHER PUBLICATIONS

Su, Ying et al., "A Digital 1.6 pJ/bit Chip Identification Circuit Using Process Variations", IEEE Journal of Solid-State Circuits, Jan. 2008, pp. 69-77, vol. 43, No. 1.

Lee, Jae W, et al., "A Technique to Build a Secret Key in Integrated Circuits for Identification and Authentication Applications, Computation Structures Group Memo 472", 2004, 6 pages, Massachusetts Institute of Technology, Computer Science and Artificial Intelligence Laboratory.

Kaps, Jens-Peter et at., "Energy Scalable Universal Hashing", IEEE Transactions on Computers. Dec. 2005, pp. 1484-1495, vol. 54, No. 12.

(Continued)

*Primary Examiner* — Brandon Hoffman
*Assistant Examiner* — Michael D Anderson
(74) *Attorney, Agent, or Firm* — Cory Claassen

(57) ABSTRACT

Detection and deterrence of device tampering and subversion by substitution may be achieved by including a cryptographic unit within a computing device for binding multiple hardware devices and mutually authenticating the devices. The cryptographic unit includes a physically unclonable function ("PUF") circuit disposed in or on the hardware device, which generates a binding PUF value. The cryptographic unit uses the binding PUF value during an enrollment phase and subsequent authentication phases. During a subsequent authentication phase, the cryptographic unit uses the binding PUF values of the multiple hardware devices to generate a challenge to send to the other device, and to verify a challenge received from the other device to mutually authenticate the hardware devices.

16 Claims, 13 Drawing Sheets

(56) References Cited

OTHER PUBLICATIONS

Kumar, Sandeep S. et al., "Extended Abstract: The Butterfly PUF Protecting IP on every FPGA", Proceedings of the 2008 IEEE International Workshop on Hardware-Oriented Security and Trust, 2008, 4 pages.

Guajardo, Jorge et al., "FPGA Intrinsic PUFs and Their Use for IP Protection", Proceedings of the 9th international workshop on Cryptographic Hardware and Embedded Systems, Lecture Notes in Computer Science; vol. 4727, 2007, pp. 63-80.

Dodis, Yevgeniy et al., "Fuzzy Extractors: How to Generate Strong Keys from Biometrics and Other Noisy Data", SIAM Journal on Computing, 2008, 18 pages, vol. 38, Issue 1.

Maes, Roel et al., "Intrinsic PUFs from Flip-flops on Reconfigurable Devices", $3^{rd}$ Benelux Workshop on Information and System Security, Nov. 2008, 17 pages.

Krawczyk, Hugo, "LFSR-based Hashing and Authentication", Advances in Cryptology—Crypto '94, LNCS 839, 1994, pp. 129-139.

Suh, Edward G. et al., "Physical Unclonable Functions for Device Authentication and Secret Key Generation", Proceedings of the 44th annual Design Automation Conference, 2007, pp. 9-14.

Guajardo, Jorge et al., "Physical Uncionabie Functions and Public-Key Crypto For FPGA IP Protection", 2007, 7 pages, Philips Research Laboratories, Eindhoven, The Netherlands.

Gassend, Blase et al., "Silicon Physical Random Features, Computation Structures Group Memo 456", In the proceedings of the Computer and Communication Security Conference, Nov. 2002, 15 pages, Massachusetts Institute of Technology, Computer Science and Artificial Intelligence Laboratory.

Tuyls, P. et al., "Secret Key Generation from Classical Physics, Physical Unclonabie Functions", 2006, 20 pages, Phillips Research Laboratories, The Netherlands.

Guajardo, Jorge et al., "Physical Unclonable Functions and Public-Key Crypto for FPGA IP Protection", Sep. 11, 2007, 22 pages, Philips Research Europe, Eindhoven, The Netherlands.

Bauer: Todd et al., "Infrastructure for Nondestructive Real-time Fingerprinting of Integrated Circuits", Laboratory Directed Research and Development Presentation Day, Sep. 14, 2009, 1 page, Sandia National Laboratories, Albuquerque, New Mexico.

Kommerling, Oliver et al., "Design Principles for Tamper-Resistant Smartcard Processors", Proceedings of the USENIX Workshop on Smartcard Technology on USENIX Workshop on Smartcard Technology, May 10-11, 1999, 13 pages, USENIX Association.

ATIS Telecom Glossary 2007, http://www.atis.org/glossary/definition.aspx?id=3516 >, retrieved from Internet on Sep. 9, 2010, 2 pages.

Roy, Jarrod A. et al, "Protecting Bus-based Hardware IP by Secret Sharing", Proceedings of the 45th Annual Design Automation Conference, 2008, 6 pages, Anaheim, CA.

Kirkpatrick., Michael et al., "Physically Restricted Authentication and Encryption for Cyber-physical Systems", DHS Workshop on Future Directions in Cyber-physical Systems Security, 2009, 5 pages.

\* cited by examiner

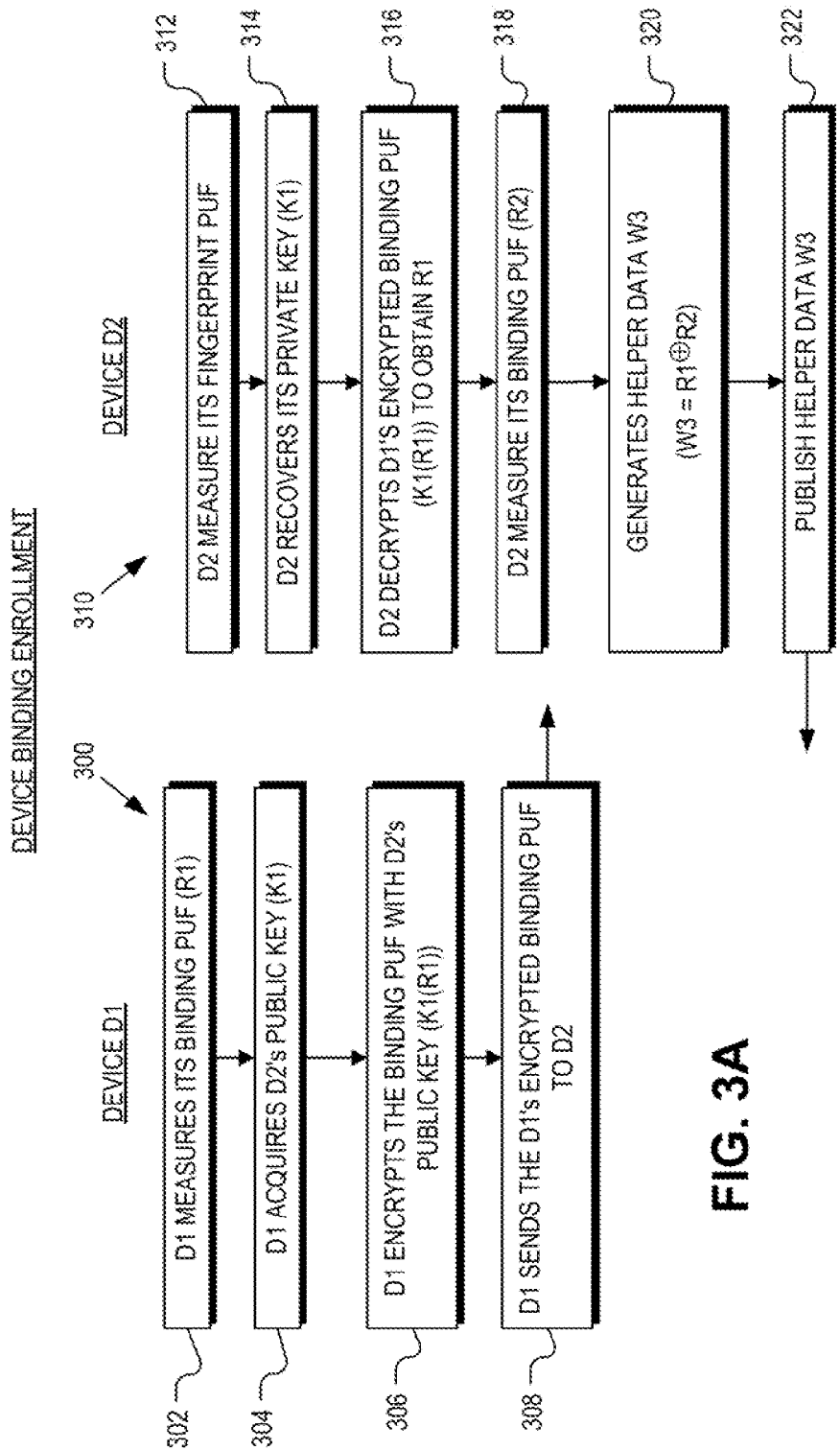

HARDWARE DEVICE BINDING AND MUTUAL AUTHENTICATION

RELATED APPLICATIONS

This application is a continuation-in-part of U.S. patent application Ser. No. 12/844,860, entitled "Deterrence of Device Counterfeiting, Cloning, and Subversion by Substitution Using Hardware Fingerprinting," filed Jul. 27, 2010, the contents of which are hereby incorporated by reference.

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to trusted computing, and in particular but not exclusively, relates to hardware device binding and mutual authentication to protect against tampering and subversion by substitution.

BACKGROUND INFORMATION

Trustworthy computing (with software) cannot exist without trustworthy hardware to build it on. Even if an integrated circuit is produced using rigorous procedures in a "Trusted Foundry" and certified as "trustworthy," technology must be developed to ensure against wholesale replacement of the component with a separately manufactured but subverted "look-alike" after the point of certification. Without detection of subversion by wholesale component substitution, today's information processing systems are vulnerable to sophisticated adversaries that can fabricate "look-alike" components that perform the same function as the intended component but which may contain additional subversion artifices that can be later triggered by an adversary to disrupt or compromise operation.

Using physical system protection schemes to prevent subversive attacks in deployed information processing hardware is technically difficult and expensive. An alternative to resisting subversive attack with physical system protection schemes is to employ robustly authenticated and protected hardware architectures to enable tracing of the origin of these components. Physically Unclonable Function (PUF) technology may be leveraged to deter adversaries from attempting subversion by insertion of subversive functionality and by instantiation of counterfeit components (subversion via substitution). PUFs are derived from the inherently random, physical characteristics of the material, component, or system from which they are sourced, which makes the output of a PUF physically or computationally very difficult to predict. Silicon-based microelectronics appear to be a potentially rich source of PUFs because subtle variations in the production processes result in subtle variations in the physical and operational properties of the fabricated devices. Additionally, each device can have millions of exploitable transistors, circuits, and other active and passive components. Accordingly, PUFs extracted from microelectronics are of keen interest because of their potential applications to cyber security. Alternatively, other hardware identifiers (e.g., globally unique identifier (GUID)) may be used in place of the binding PUF values as would be appreciated by one of ordinary skill in the art having the benefit of this disclosure. It should be noted, however, that using other hardware identifiers may lose the benefit of detecting tampering, which would reduce the security of the system. Binding with other type of hardware identifiers, instead of binding PUF values, may still provide some additional security to systems.

Trusted foundry processing of silicon-based microelectronics requires enormous investments to protect against subversion; however, this investment imparts trust only during the fabrication phase of a component's life cycle. Without the equivalent of rigorous two-person control of the component during the deployment phase of its life cycle, it can be difficult to demonstrate authenticity even for components from today's trusted foundries.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3A is a flow chart illustrating a process of a first device for binding the first device to a second device, in accordance with an embodiment of the invention.

FIG. 3B is a flow chart illustrating a process of the second device for binding the first device and the second device, in accordance with an embodiment of the invention.

DETAILED DESCRIPTION

Figure 1:
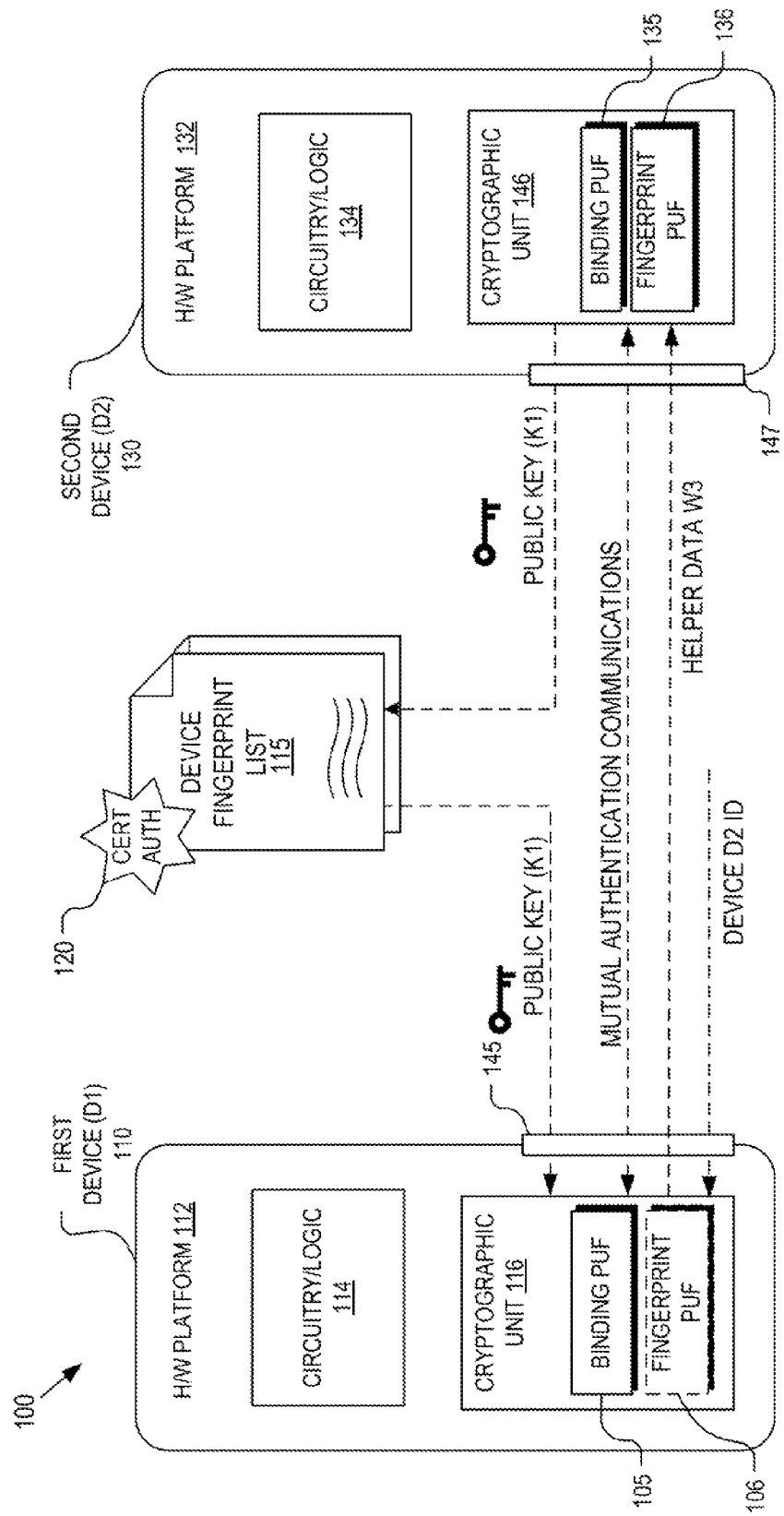
FIG. 1 is a functional block diagram illustrating an infrastructure for binding and mutually authenticating multiple hardware devices and detecting device tampering and subversion by substitution, in accordance with an embodiment of the invention.

Embodiments of a system and method for binding and mutually authenticating multiple hardware devices to detect and deter device tampering and subversion by substitution are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention augment the trustworthiness of deployed information processing systems by introducing the concept of cryptographically binding multiple hardware devices and allowing the hardware devices to mutually authenticate one another to protect against device tampering and subversion by substitution. This allows security to be enhanced by allowing integrated circuits (ICs) to verify that the other ICs they are interacting with are the same ICs that they were bound to during a previous enrollment phase. As such, unauthorized changes (modification or substitutions) to the system will be detected by the ICs within the system. Disclosed embodiments leverage Physical Unclonable Function (PUF) technology for creating unique binding PUFs for each hardware device, as well as unique fingerprint PUFs for each hardware device. The fingerprint PUFs can be used for hardware device fingerprinting, also called IC fingerprinting, which allows an authenticating entity (referred to as a challenger) to validate that a particular device is the same physical unit enrolled in an earlier enrollment phase. The binding PUFs be used for device binding, also referred to as IC binding, which allows a device (also referred to as a component) to validate that a particular device that it is communicating with is the same physical unit that it was bound to during an earlier enrollment phase. In addition, during mutual authentication, the hardware devices can generate an initial key. The initial key could be used as an encryption key (e.g. a key for a symmetric encryption algorithm), as an authentication key for a keyed hash or a keyed message authentication code for subsequent authentication of data between devices, or could be used to generate keys for both encryption and authentication.

FIG. 1 is a functional block diagram illustrating an infrastructure 100 for binding and mutually authenticating multiple hardware devices and detecting device tampering and subversion by substitution, in accordance with an embodiment of the invention. The illustrated embodiment of infrastructure 100 includes two hardware devices ($D_1$) 110 and 130 ($D_2$) to be cryptographically bound during an enrollment phase, and to be mutually authenticated during an authentication phase, and a device fingerprint list 115 maintained or certified by a certification authority 120. The illustrated embodiment of first device ($D_1$) 110 includes a hardware platform 112, primary circuitry (or function logic) 114 of the device, a cryptographic unit 116 including a binding PUF circuit 105 and an optional fingerprint PUF circuit 106, and an input/output ("I/O") ports 145. The illustrated embodiment of second device 130 ($D_2$) includes a hardware platform 132, primary circuitry (or function logic) 134 of the device, a cryptographic unit 146 including a binding PUF circuit 135 and a fingerprint PUF circuit 136, and input/output ("I/O") ports 147. Operation of infrastructure 100 is described in connection with processes 300, 310, and 400 illustrated in the flow charts of FIGS. 3A, 3B, and 4, respectively.

First device ($D_1$) 110 and second device ($D_2$) 130 may each represent any device of which hardware authentication during the deployment phase of its lifecycle is desired. For example, first device, ($D_1$) 110 and second device ($D_2$) 130 may each represent a CPU, a microcontroller, video card, or virtually any hardware device, which may or may not include software/firmware code. Hardware platforms 112 and 132 may each include a semiconductor die of an application specific IC ("ASIC") or general purpose IC (e.g., CPU), a field programmable gate array ("FPGA") (e.g., Altera Stratix II FPGA), a printed circuit board ("PCB"), or otherwise. It should be appreciated that hardware platforms 112 and 132 may each include memory units for storing executable code (e.g., software or firmware) for operating primary circuitry 114 and 134 and/or portions of cryptographic units 116 and 146, respectively.

External communication with cryptographic unit 116 is conducted through I/O ports 145. External communication with cryptographic unit 146 is conducted through I/O ports 147. In one embodiment, I/O ports 145 and 147 may each include existing industry standard test ports, such as a Joint Test Action Group ("JTAG") test access port ("TAP"). Of course, external communications may be multiplexed over standard data ports or other types of test ports.

The cryptographic units 116 and 146 may be implemented entirely within hardware or partially using hardware and partially using software/firmware. In either embodiment, binding PUF circuits 105 and 135 and/or fingerprint PUF circuits 106 and 136, which may be implemented using any PUF circuit having suitably small intra-device variation and sufficiently large inter-device variation, along with primary circuitry 114 and 134 are integrated into hardware platforms 112 and 132. For example, if first device ($D_1$) 110 is a semiconductor based integrated circuit ("IC"), and then binding PUF circuit 105 may be integrated with the device circuitry 114 in the semiconductor die. Of course, other components of cryptographic units 116 and 146 (described below in connection with FIGS. 2A-2D) may also be integrated into hardware platform 112 of first device ($D_1$) 110 and corresponding elements integrated into hardware platform 132 of second device ($D_2$) 130.

PUFs are functions that are derived from the inherently random, physical characteristics of the material or device in which they are built. For example, silicon PUFs may exploit variations in the delay through interconnects and gates or slight differences in threshold voltage. Since the PUF exploits physical variations of the device or material in which it is built, each PUF should provide a unique (although perhaps noisy) response. This property should hold even amongst "identical" devices fabricated with the same process. Moreover, it should be difficult to purposefully produce a PUF with the same output as a given PUF. The quality of a PUF can be measured by inter-device variation and intra-device variation. Ideally, the inter-device variation of a PUF should be near 50% so different devices produce very different output, while the intra-device variation should be near 0% so that a given device consistently provides the same response. In practice, inter-device and intra-device variations will be non-ideal. Additionally, a good PUF should be resistant to changes in factors, such as, for example, temperature and supply voltage.

Binding PUF circuits 105 and 135 can be used to generate binding PUF values for hardware device binding, also referred to as IC binding. In hardware device binding, the binding PUF values are combined to generate helper data that allows the devices to learn each other's unique binding PUFs for cryptographically binding the hardware devices. In device authentication, the binding PUF values can be used to allow the devices to subsequently authenticate and re-authenticate one another at any time during the deployment phase of a component life cycle using a mutual cryptographic challenge/response protocol (described below with respect to FIG. 4). The binding PUF values can also be used to generate an initial key that can be used as an encryption key (e.g., a key for a symmetric encryption algorithm), an authentication key (e.g., for a keyed hash or keyed message authentication code), or could be used to produce both encryption and authentication keys, to protect the shared communication signals or a bus that connects the devices 110 and 130, or the like.

Fingerprint PUF circuits 106 and 136 can be used to generate fingerprint PUF values for hardware device fingerprinting, also called IC fingerprinting. In short, hardware device fingerprinting allows an authenticating entity (referred to as a challenger) to validate that a particular device is the same physical unit enrolled in an earlier enrollment phase. In one embodiment, the binding enrollment procedure assumes that at least one of the devices (e.g., second device ($D_2$) 130) has stored a public key in device fingerprint list 115 that is indexed to the second device's ID. In this context, the combination of the public key and device ID operate as a sort of cryptographic hardware fingerprint that is uniquely associated with the particular hardware instance of second device ($D_2$) 130. First device ($D_1$) 110.may also have a unique hardware fingerprint stored in device fingerprint list 115. The ID may be a manufacturing serial number, a globally unique identifier ("GUID"), or other unique identifier associated with hardware platform 132 of second device 130. Device fingerprint list 115 may be populated by a manufacturer of the devices prior to the devices being shipped to customers as a means of tracking and authenticating part numbers or by another entity in the supply chain wishing to provide for subsequent authentication of these devices. Device fingerprint list 115 may subsequently be accessed by a customer, an OEM manufacturer incorporating the devices into a larger system, an end-user, or a third party interacting with the devices (either directly or remotely over a communication channel) wishing to authenticate the devices (discussed in connection with FIG. 7). As an added security measure, device fingerprint list 115 may be signed and maintained by a trusted third party, such as a certification authority 120 of a public key infrastructure. First device ($D_1$) 110 uses the second device's public key to encrypt the first device's binding PUF value ($R_1$) before sending it to second device ($D_2$) 130 over a communication channel. The communication channel may be a wire, a circuit board trace, Ethernet connection, or the like. Although some of the illustrated embodiments use the public key generated during device fingerprint, in other embodiments, the devices 110 and 130 can use other encryption techniques to encrypt the first device's binding PUF value ($R_1$) before sending it to second device ($D_2$) 130, such as using a symmetric key algorithm. Alternatively, the second device could use the first device's public key to encrypt its binding PUF value ($R_2$) before sending it to first device ($D_1$) 110. Alternatively, first device ($D_1$) 110 sends the first device's binding PUF value ($R_1$) over an unsecure communication channel.

The fingerprint PUF values remain internal to devices 110 and 130 and are not transmitted externally. In one embodiment, the fingerprint PUF value is generated in real-time each time it is need and is not stored for future use internally. The fingerprint PUF value is a n-bit value (e.g., n=2474 bits) that may be generated via corresponding individual PUF circuits for each bit, generated in response to 'n' input test vectors that reconfigure a single PUF circuit to generate the n-bit value, or some combination of both. Unlike the fingerprint PUF values that remain internal to the devices 110 and 130, respectively, and are not transmitted externally, the binding PUF values may be transmitted externally to the respective device for hardware device binding and mutual authentication. The fingerprint PUF value provides for authentication of the device at various points in the component life cycle on behalf of a human entity and for (re)generation of a device-unique private key-public key pair, and the binding PUF value provides for the authentication of the device to other devices at various points in the subsystem life cycle.

Figure 2A:
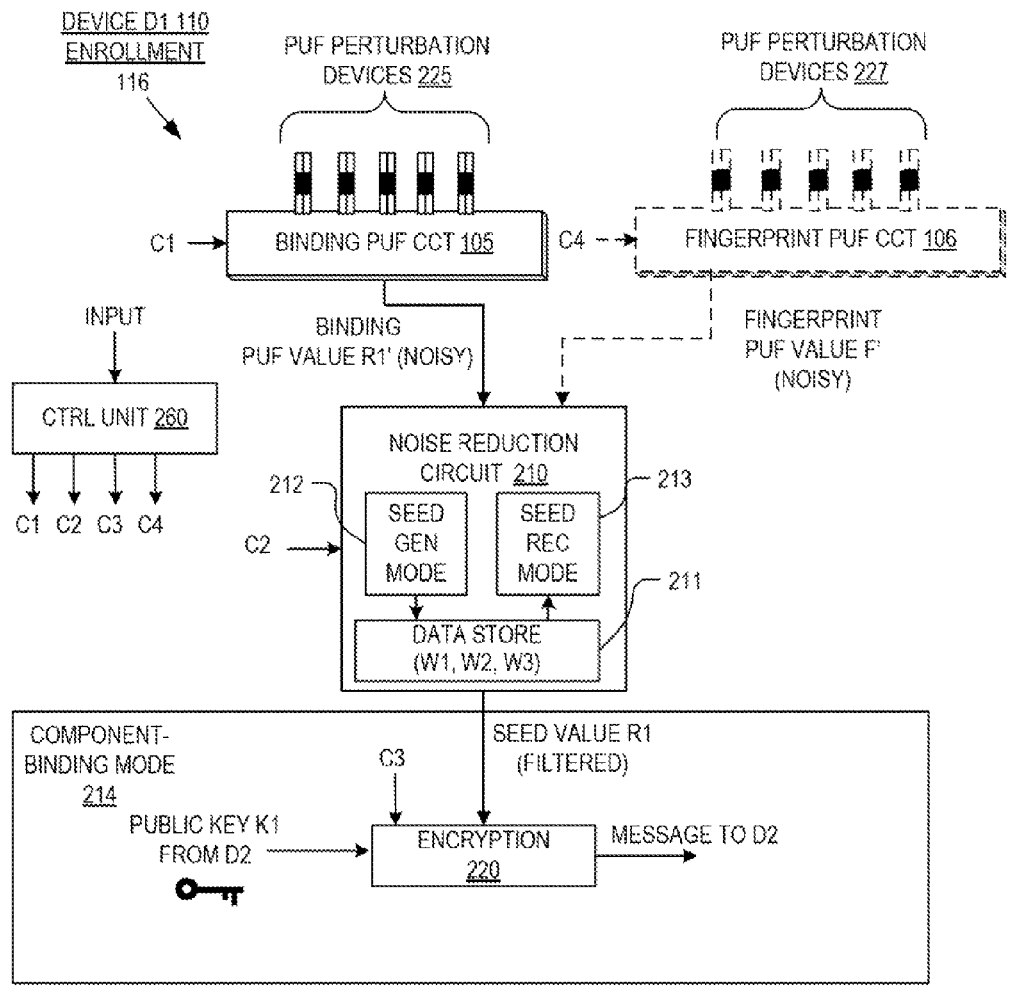
FIG. 2A is a functional block diagram illustrating a cryptographic unit of the first device for binding the first device to a second device during an enrollment phase, in accordance with an embodiment of the invention.

FIG. 2A is a functional block diagram illustrating a cryptographic unit 116 of a first device 110 for binding first device 110 to a second device 130 during an enrollment phase, in accordance with an embodiment of the invention. During operation of a component-binding mode 214, the depicted cryptographic unit 116 includes binding PUF circuit 105 disposed in or on hardware platform 112, the optional fingerprint PUF circuit 106 disposed in or on hardware platform 112, a noise reduction circuit 210, encryption logic 220, optional PUF perturbation devices 225 and 227, and a control unit 260. The illustrated embodiment of noise reduction circuit 210 includes a data store 211, a seed generation mode 212, and a seed recovery mode 213.

Control unit 260 may receive inputs and generate outputs to be coupled to the components of cryptographic unit 116 to choreograph their operation. Control unit 260 may be implemented as software/firmware instructions executing on a microcontroller, an ASIC, a state machine, or otherwise. In some embodiments, control unit 260 need not control all of the components of cryptographic unit 116. For example, in an embodiment where binding PUF circuit 105 is implemented using a cross-coupled type PUF, then control unit 260 may not provide any control signaling to binding PUF circuit 105 or may simply include an enable signal to enable binding PUF circuit 105. However, in one embodiment where binding PUF circuit 105 is implemented using an arbiter type PUF, control unit 260 may receive the SEL bits as the INPUT to configure binding PUF circuit 105.

PUF perturbation devices 225 are programmable devices that can be used to increase the variability of binding PUF circuit 105 by affecting the delay paths within binding PUF circuit 105. For example, PUF perturbation devices 225 may be programmable by the end user to facilitate user customization and user control over the variability and output of binding PUF circuit 105. In one embodiment, PUF perturbation devices 225 are programmable anti-fuses that are either coupled to delay paths with binding PUF circuit 105 or disposed adjacent to a delay path within binding PUF circuit 105. The parasitic coupling between a coupled (or adjacent) PUF perturbation device 225 has the effect that the programmed state of each of PUF perturbation devices 225 can randomly change the binding PUF value output by binding PUF circuit 105. The user may program PUF perturbation device 225 upon first use to change the binding PUF value or to change the binding PUF value at a later time if the end user ever becomes concerned that the privacy of the binding PUF values or the PUF seeds have been compromised. Similarly, PUF perturbation devices 227 may be used in connection with fingerprint PUF circuit 106 of first device 110.

During operation, binding PUF circuit 105 outputs a binding PUF value, which may be an inherently noisy value in some designs due to thermal variations, etc. Thus directly using the binding PUF value ($R_1'$) to seed encryption logic 220 may not be advisable in some implementations. Accordingly, in some embodiments a noise reduction circuit 210 is interposed between encryption logic 220 and binding PUF circuit 105 to convert the noisy binding PUF value ($R_1'$) to a filtered PUF seed ($R_1$) that is stable and repeatable (e.g., corrects for intra-device variation). While it is desirable for a given binding PUF circuit 105 to output different, random values between different physical devices, it is not desirable for a given PUF circuit of a single instance of the device to output different values over its lifecycle (unless the PUF perturbation devices have been reprogrammed by the end user as part of a deliberate reconfiguring of the device). Thus, noise reduction circuit 210 operates to remove the uncertainty in the noisy binding PUF value ($R_1'$). In one embodiment, noise reduction circuit 210 is implemented as a fuzzy extractor, which uses error correcting code ("ECC") techniques to remove undesirable variability. Operation of a fuzzy extractor implementation of noise reduction circuit 210 is discussed in detail in connection with FIGS. 5 and 6 below.

Encryption logic 220 is coupled to receive a seed value ($R_1$), which is based on the binding PUF value from binding PUF circuit 105. Encryption logic 220 uses the second device's public key of the public-private key pair ($K_1$), obtained from second device ($D_2$) 130, to encrypt the seed value ($R_1$). Encryption logic 220 generates a message with the encrypted seed value ($K_1(R_1)$) and sends it to second device ($D_2$) 130. Cryptographic unit 146 of second device 130, as the sole holder of the private key, is the only entity capable of decrypting the message ($K_1(R_1)$), encrypted using the corresponding public key. In one embodiment, the private key is never transmitted externally to second device 130, and is not stored or retained any longer than required to decrypt the authentication challenge. Each time the private key is needed by the second device 130, the private key is regenerated using the fingerprint PUF value, and then subsequently deleted or erased after use. Similarly, the other PUF values and seed values are not stored or retained any longer than necessary.

The illustrated embodiment of noise reduction circuit 210 includes at least two modes of operation: seed generation mode 212 and a seed recovery mode 213. Control unit 260 places noise reduction circuit 210 into seed generation mode 212 during the enrollment phase for binding first device 110 to second device 130, while control unit 260 places noise reduction circuit 210 into seed recovery mode 213 during subsequent mutual authentication phases, including a challenge generation mode and a challenge verification mode, illustrated and described below with respect to FIG. 2C.

Figure 2B:
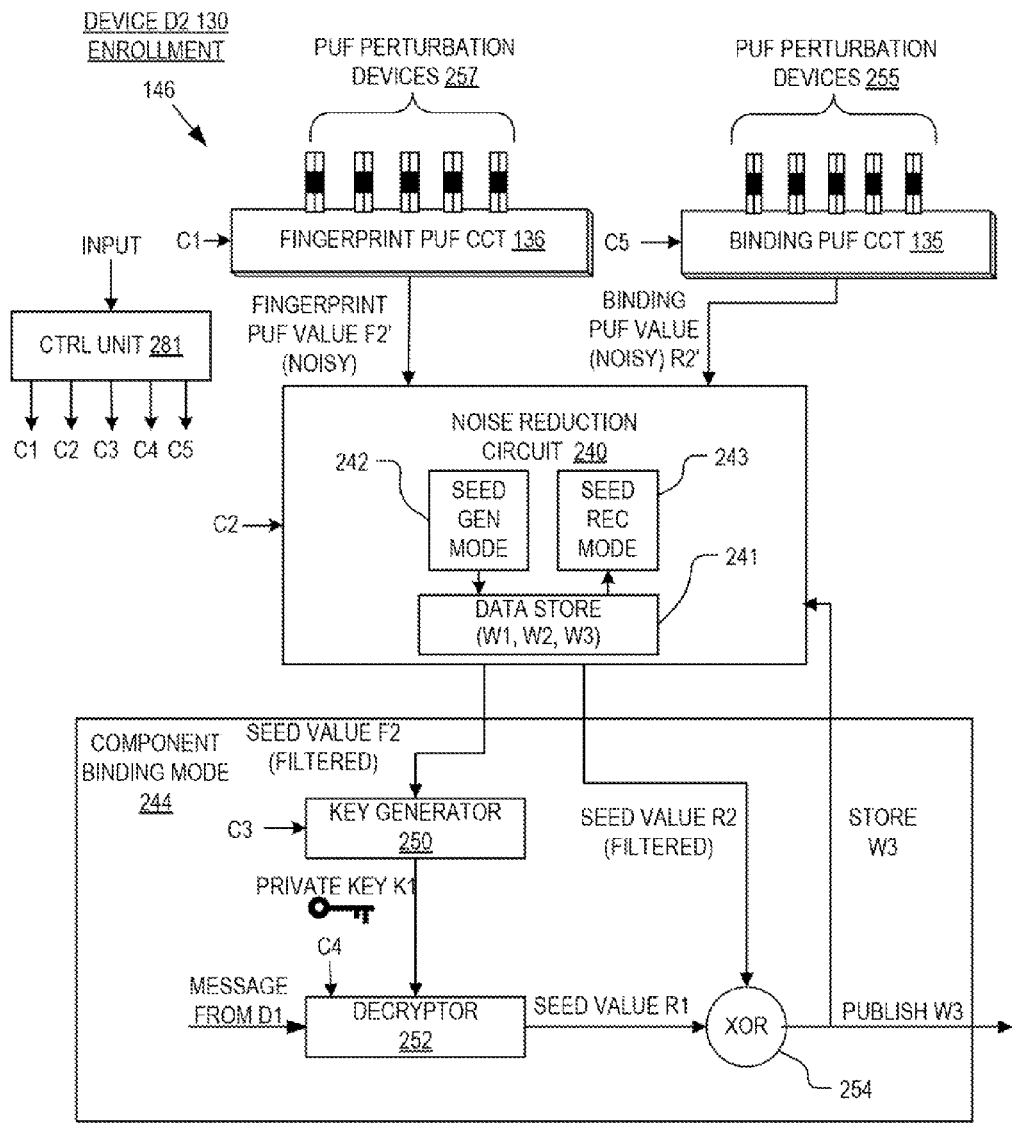
FIG. 2B is a functional block diagram illustrating a cryptographic unit of a second device for binding the first device and second device during the enrollment phase, in accordance with an embodiment of the invention.

FIG. 2B is a functional block diagram illustrating a cryptographic unit 146 of a second device 130 for binding first device 110 and second device 130 during the enrollment phase, in accordance with an embodiment of the invention. During operation of a component-binding mode 244, the depicted cryptographic unit 146 includes a binding PUF circuit 135 disposed in or on hardware platform 132, a fingerprint PUF circuit 136 disposed in or on hardware platform 132, a noise reduction circuit 240, a key generator 250, a decryptor 252, a logic unit 254, PUF perturbation devices 255, PUF perturbation devices 257, and a control unit 281. The illustrated embodiment of noise reduction circuit 240 includes a data store 241, a seed generation mode 242, and a seed recovery mode 243.

Control unit 281 may receive inputs and generate outputs to be coupled to the components of cryptographic unit 146 to choreograph their operation, as described above for control unit 260. PUF perturbation devices 255 and 257 are similar to PUF perturbation devices 225 and 227 of FIG. 2A.

During operation, fingerprint PUF circuit 136 outputs a fingerprint PUF value (F2'), which may be an inherently noisy value in some designs due to thermal variations, etc. Accordingly, in some embodiments a noise reduction circuit 240 (e.g., fuzzy extractor) is interposed between key generator 250 and fingerprint PUF circuit 136 to convert the noisy fingerprint PUF value (F2') to a filtered PUF seed (F2) that is stable and repeatable. Thus, like noise reduction circuit 210, noise reduction circuit 240 operates to remove the uncertainty in the noisy fingerprint PUF value (F2'). In one embodiment, noise reduction circuit 240 is implemented as a fuzzy extractor, which uses ECC techniques to remove undesirable variability. Operation of a fuzzy extractor implementation of noise reduction circuit 240 is discussed in detail in connection with FIGS. 5 and 6 below.

During component-binding mode 244, key generator 250 is coupled to receive a seed value (F2), which is based on the fingerprint PUF value (F2') measured from fingerprint PUF circuit 136. Key generator 250 uses the seed value (F2) to seed its encryption engine and generate a unique public-private key pair. In the component-binding mode 244, key generator 250 recovers the private key of the public-private key pair in order to decrypt the message sent from first device ($D_1$) 110. During operation, the private key is also kept internal to cryptographic unit 146 and never exported externally from second device ($D_2$) 130. In contrast, during a fingerprinting operation, the public key is exported from second device 130 along with a device ID to enroll the device fingerprint with device fingerprint list 115. As described above with respect to FIG. 2A, first device ($D_1$) 110 uses the second device's public key to encrypt the message containing the first device's binding PUF value ($R_1$). After key generation, device circuitry 134 (e.g., IC) then clears its internal registers so that the fingerprint PUF value (F2'), the private key, and the seed value (F2) stored in cryptographic unit 146 are erased.

Cryptographic unit 146, as the sole holder of the private key, is the only entity capable of decrypting the message that is encrypted using the corresponding public key. Thus, during an enrollment phase, first device 110 presents the encrypted message to second device 130. Decryptor 252 receives the encrypted message and uses the private key to decrypt the message to generate the first device's seed value ($R_1$), which is based on the first device's binding PUF value ($R_1'$).

Binding PUF circuit 135 outputs a binding PUF value ($R_2'$), which may be an inherently noisy value in some designs due to thermal variations, etc. Noise reduction circuit 240 may be used to convert the noisy binding PUF value ($R_2'$) to a filtered PUF seed ($R_2$) that is stable and repeatable. Thus, noise reduction circuit 240 operates to remove the uncertainty in the noisy binding PUF value ($R_2'$).

Logic unit 254 is coupled to receive the first device's binding seed value ($R_1$) from decryptor 252 and the second device's binding seed value ($R_2$). Logic unit 254 combines the binding seed values to generate helper data ($W_3$). In the illustrated embodiment, logic unit 254 uses an XOR function to combine the two values, though other logic functions may be implemented. It should be noted that other logic functions need to be reversible, and that in the output, the two inputs are hidden so that one cannot look at the output and determine the inputs. The helper data $W_3$ is a value, which is used during the mutual authentication phase to allow first device 110 to learn the second device's seed value ($R_2$) and the second device to learn the first device's seed value ($R_1$). The cryptographic unit 146 stores the helper data ($W_3$) internally in data store 241, as well as publicly (stored publicly on second device 130 itself and/or external to second device 130). For example, second device 130 can publish the helper data ($W_3$) in device fingerprint list 115 or another list that can be accessed by first device 110. For another example, second device 130 can send the helper data ($W_3$) back to first device 110, such as in response to receiving the encrypted message with the first device's seed value ($R_1$). It should be noted that this helper data is different than the helper data ($W_1$ and $W_2$) described below with respect to FIGS. 5 and 6. Since the first device's seed value ($R_1$) is encrypted with the second device's public key, second device 130 is the only entity capable of knowing the first device's seed value ($R_1$) even though transmitted externally to first device 110. Since second device 130 does not publish its seed value ($R_2$), the first and second devices are the only entities capable of recovering one another's seed values ($R_2$ and $R_1$), respectively.

In another embodiment, the device binding algorithm can be described in the following algorithms:
Enrollment:
a. $D_1$ acquires $D_2$'s public key $K_1$ and sends $K_1(R_1)$ to $D_2$
b. $D_2$ decrypts $K_1(R_1)$ to obtain $R_1$ and emits $W_3$-$R_1 \oplus R_2$, which is made public
Binding Authentication:
a. $D_1$ uses $W_1$ and the fuzzy extraction process to recover its PUF output $R_1$
b. $D_2$ uses $W_2$ and the fuzzy extraction process to recover its PUF output $R_2$
c. $D_1$ calculates $R_1 \oplus W_3 = R_2$
d. $D_2$ calculates $R_2 \oplus W_3 = R_1$
e. $D_1$ generates nonce $e_1$ and transmits it to $D_2$
f. $D_1$ generates nonce $e_2$ and transmits it to $D_1$
g. $D_1$ randomly selects initial symmetric key $K_2$ (is a randomly selected symmetric key unrelated to the public keys)
h. $D_2$ randomly selects initial symmetric key $K_3$
i. $D_1$ transmits $h(R_2|e_1)$, $h(R_2) \oplus K_2$ to $D_2$, where $h( )$ is one-way
j. $D_2$ transmits $h(R_1|e_2)$, $h(R_1) \oplus K_3$ to $D_1$
k. $D_1$ verifies $h(R_1|e_2)$, calculates $h(R_1)$ and recovers $K_3$
l. $D_2$ verifies $h(R_2,e_1)$, calculates $h(R2)$ and recovers $K_2$
m. $K_2 \oplus K_3$ is used as the initial key In another embodiment, in steps I the hash $h(R_2)$ can be replaced by $h(R_1)$ and in step J the hash $h(R_1)$ can be replaced by $h(R_2)$, since both devices know $R_1$ and $R_2$. However, the devices should not both use $h(R_1)$ or $h(R_2)$ because an adversary could then calculate $(h(R_i) \oplus K_2) \oplus (h(R_i) \oplus K_3) = K_2 \oplus K_3$, revealing the initial key. Note however that step M could be modified to a different combination of $K_2$ and $K_3$ that would permit the devices to choose the same $R_i$ in steps I and J. For example, the initial key could be calculated as $h(K_2) \oplus K_3$.

The illustrated embodiment of noise reduction circuit 240 includes at least two modes of operation: seed generation mode 242 and a seed recovery mode 243. Control unit 281 places noise reduction circuit 240 into seed generation mode 242 during the enrollment phase for binding second device 130 to first device 110, while control unit 281 places noise reduction circuit 240 into seed recovery mode 243 during subsequent mutual authentication phases, including a challenge generation mode and a challenge verification mode, illustrated and described below in connection with FIG. 2D. After the enrollment phase, the two devices (e.g., ICs) trust that the other device is one of those intended by the designer to interoperate with, and in the future they will only trust devices with which they have previously been enrolled. In subsequent mutual authentication phases, the two devices can use their PUF values and the helper data ($W_3$) for mutual authentication as described in FIGS. 2C and 2D. If either of the devices has changed (e.g., due to component substitution or modification that would affect PUF generation), then the authentication procedure will fail and appropriate action can be taken by system. For example, the system could raise an alarm or halt.

Figure 2C:
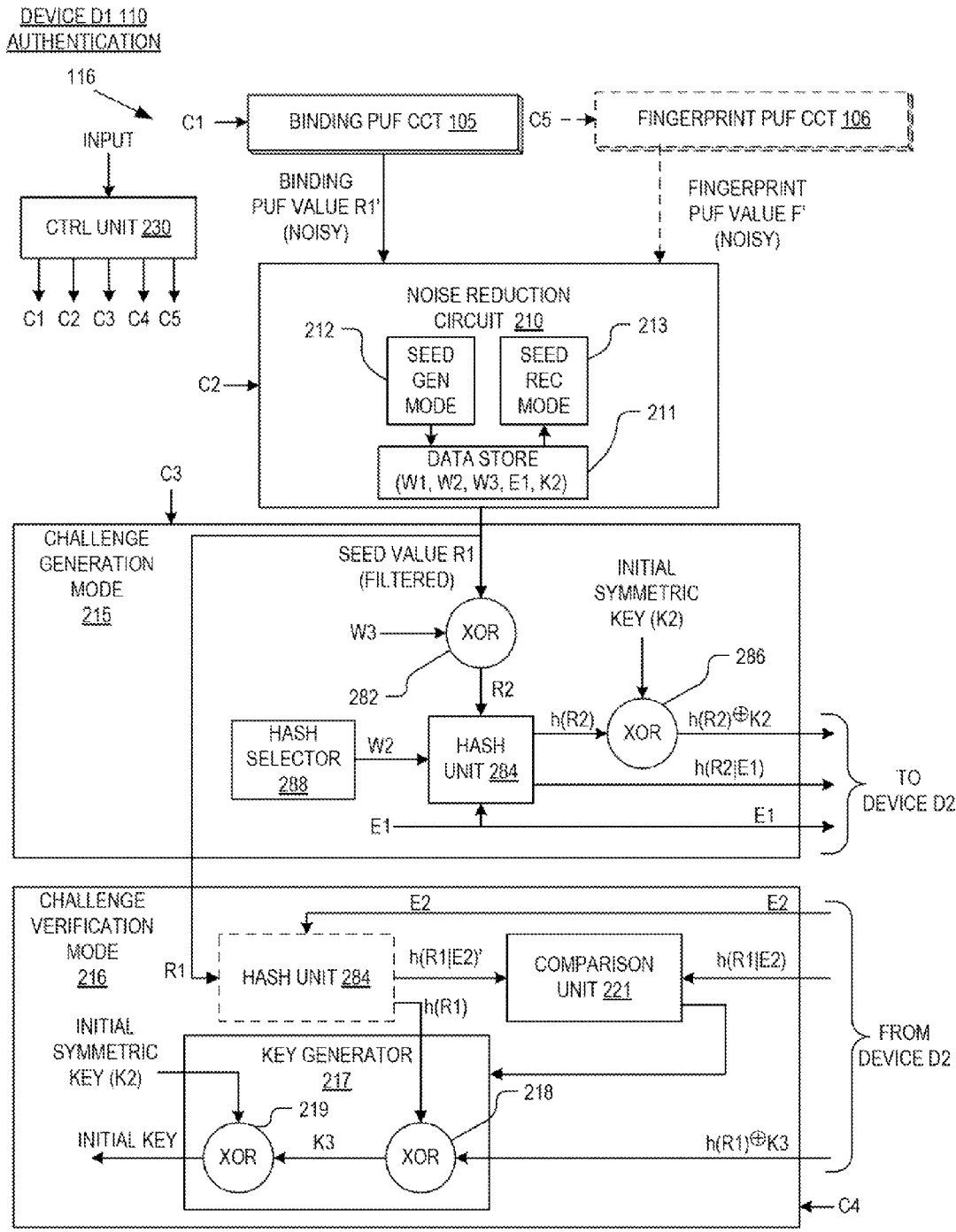
FIG. 2C is a functional block diagram illustrating the cryptographic unit of the first device of FIG. 2A for mutually authenticating the first device and the second device during a subsequent mutual authentication phase, in accordance with an embodiment of the invention.

FIG. 2C is a functional block diagram illustrating cryptographic unit 116 of first device 110 of FIG. 2A for mutually authenticating first device 110 and second device 130 during a subsequent mutual authentication phase, in accordance with an embodiment of the invention. During the subsequent authentication phase, cryptographic unit 116 operates in one of two modes: a challenge generation mode 215 and a challenge verification mode 216.

During operation of challenge generation mode 215, binding PUF circuit 105 outputs a binding PUF value ($R_1'$). Seed recovery mode 213 of noise reduction circuit 210 operates to remove the uncertainty in the noisy binding PUF value ($R_1'$), and converts the noisy binding PUF value ($R_1'$) to a filtered PUF seed ($R_1$) that is stable and repeatable. Logic unit 282 (e.g., depicted XOR operation) is coupled to receive the seed value ($R_1$), which is based on the binding PUF value from binding PUF circuit 105, and the helper data ($W_3$) stored in data store 211. Logic unit 282 combines the binding seed value ($R_1$) and the helper data ($W_3$) to compute the second device's seed value ($R_2$). Cryptographic unit 116 generates a first test value ($E_1$) (or a first test message), as well as selects a first value ($K_2$). The test value can be a numeric value, an alphanumeric phrase, or otherwise, and the first value ($K_2$) may be a random or pseudorandom number that is ultimately used to generate an initial application key. One embodiment uses a nonce or a random nonce for the test value that is especially hard for anyone other than first device 110 to predict.

Hash unit 284 is coupled to receive the second device's seed value ($R_2$) and the first test value ($E_1$), and operates to calculates a hash value for the second device's seed value ($R_2$) based on the binding PUF value ($R_2'$) ($h(R_2)$), and a hash value of a function of the second device's binding PUF value ($R_2$) and the first test value ($E_1$) ($h(R_2|E_1)$). The function may be, for example, a XOR operation, a XNOR operation, a NAND operation, an AND operation, an OR operation, a concatenation operation, an adding function, a subtractive function, or the like. It should be noted that the function does not need to be reversible, since first device 110 knows the second device's binding PUF value ($R_2$) and the first test value ($E_1$). Logic unit 286 (e.g., depicted XOR operation) is coupled to receive the hash value for the second device's binding PUF value ($R_2$), as well as the selected first value ($K_2$), and combines them to generate a combined value ($h(R_2) \oplus K_2$). Cryptographic unit 116 sends the first test value ($E_1$), the hash value of the function of the second device's binding PUF value and the first test value ($h(R_2|E_1)$), and the combined value ($h(R_2) \oplus K_2$)) to second device ($D_2$) 130 as a first challenge.

In one embodiment, for added security the particular hash algorithm is also selected from a large set of hash algorithms, in which case, helper data ($W_2$) indicating the particular hash algorithm selected, is also stored into data store 211. In one embodiment, hash selector 288 generates $W_2$ to implement a randomized selection of the hash algorithm. In one embodiment, hash selector 288 uses a portion of the binding PUF value to randomly select a particular hash algorithm from a liner feedback shift register (LFSR) hash. In one embodiment, hash selector 288 includes an LFSR hash coupled to receive a portion of the binding PUF value. The output of the LFSR hash is then coupled into an irreducible polynomial generator, which outputs the $W_2$ value for selecting the hash algorithm. In yet another embodiment, hash selector 288 includes a random number generator coupled to an irreducible polynomial generator to generate $W_2$.

Figure 2D:
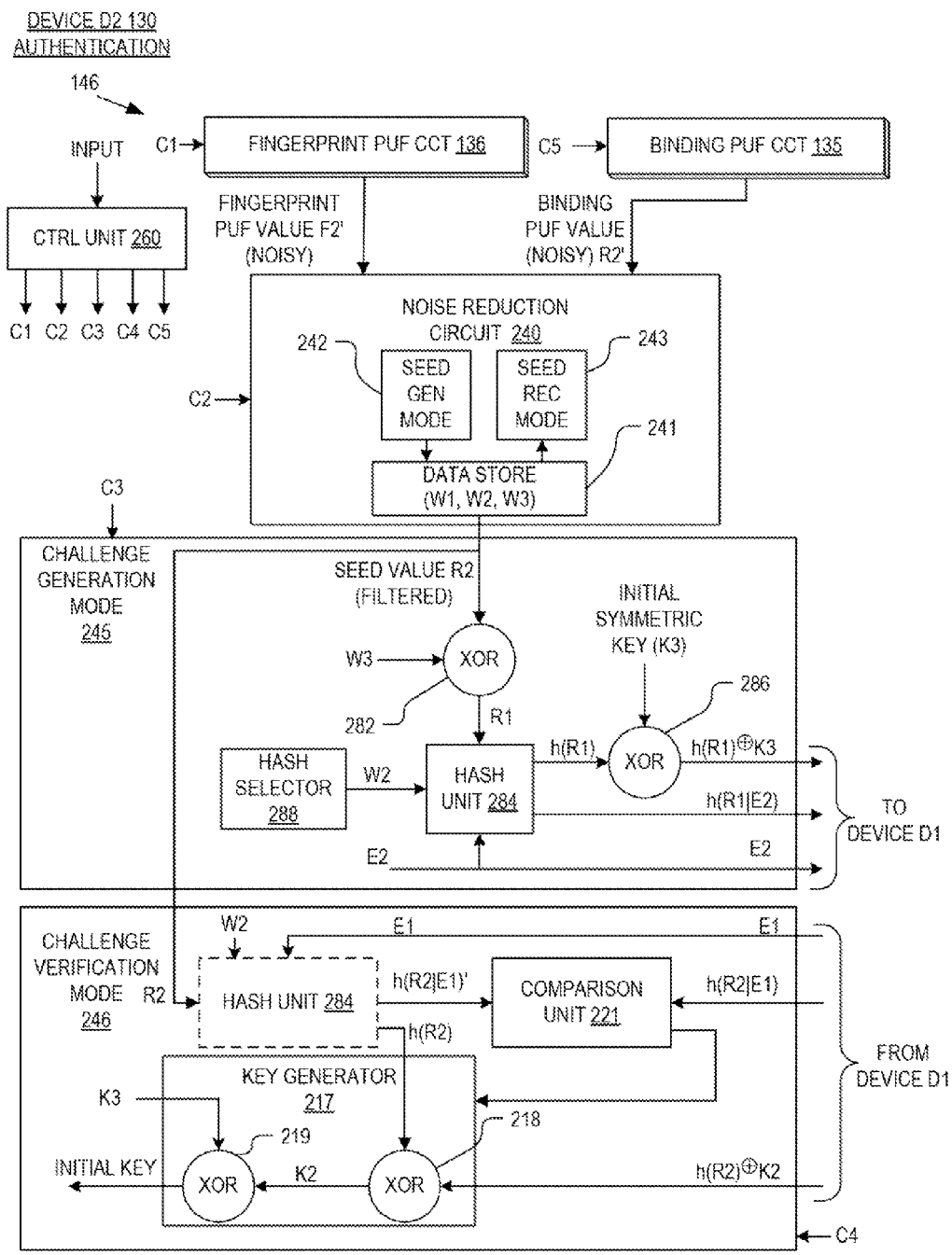
FIG. 2D is a functional block diagram illustrating the cryptographic unit of the second device of FIG. 2B for mutually authenticating the first device and the second device during a subsequent mutual authentication phase, in accordance with an embodiment of the invention.

Referring briefly to FIG. 2D, second device 130 also generates a second challenge and sends it to first device 110 to be verified in the challenge verification mode 216. The second challenge can be communicated across an unsecure channel. Subsequently or concurrently to challenge generation mode 215, cryptographic unit 116 receives the second challenge from second device 130. The second challenge includes a second test value ($E_2$), a hash value of a function of the first device's binding PUF value and the second test value ($h(R_1|E_2)$), and a combined value ($h(R_1) \oplus K_3$)). Like the first test value ($E_1$), the second test value can be a numeric value, an alphanumeric phrase, a nonce, a random nonce, or otherwise. The combined value of the second challenge is the combination of the hashed value for the first device's binding PUF value ($h(R_1)$ and a second value ($K_3$), selected by second device 130. The second value ($K_3$) may be a random or pseudorandom number that is ultimately used to generate the initial key ($K_1$).

During operation of challenge verification mode 216, binding PUF circuit 105 outputs a binding PUF value ($R_1'$). Seed recovery mode 213 of noise reduction circuit 210 operates to remove the uncertainty in the noisy binding PUF value ($R_1'$), and converts the noisy binding PUF value ($R_1'$) to a filtered PUF seed ($R_2$) that is stable and repeatable. It should be noted that if challenge generation mode 215 and challenge verification mode 216 occur close enough in time, the instance of the seed value ($R_1$) recovered for challenge generation mode 215 may be used for challenge verification mode 216. It should be noted that the seed value ($R_1$) should not be permanently stored in data store 211, but should be deleted or erased after use by challenge generation mode 215 and/or challenge verification mode 216.

Hash unit 284 (which may be the same or different instance of hash unit 284 of challenge generation mode 215), is coupled to receive the first device's seed value ($R_1$) as described above, as well as the second test value as part of the second challenge from second device 130, and operates to calculate a hash value for the first device's seed value ($R_1$) ($h(R_1)$), and a verification hash value of a function of the first device's binding PUF value ($R_1$) and the second test value ($E_2$) ($h(R_1|E_2)'$). Comparison unit 221 is coupled to receive the verification hash value of the function ($h(R_1|E_2)'$ and the hash value of the function of the first device's binding PUF value ($R_1$) and the second test value ($E_2$) ($h(R_1|E_2)$) received as part of the second challenge from second device ($D_2$) 130. Comparison unit 221 compares the verification hash value and the hash value of the function of the second challenge to authenticate second device 130. Second device 130 is authenticated when the hash values match. When second device 130 is authenticated, comparison unit 221 enables key generator 217 to generate an initial key ($K_i = K_2 \oplus K_3$). Alternatively, comparison unit 221 can halt the binding algorithm if the comparison fails and second device 130 is not authenticated. If the binding enrollment and verification processes are successful, then the devices have each obtained the same initial key in the authentication procedure of the binding algorithm.

In one embodiment, key generator 217 includes two logic units 218 and 219 (depicted XOR operations). First logic unit 218 is coupled to receive the combined value ($h(R_1) \oplus K_3$) of the second challenge, and the hash value for the first device's seed value ($R_1$) ($h(R_1)$), calculated by hash unit 284. The first logic unit 218 combines them to generate the second value ($K_3$). The second logic unit 219 is coupled to receive the second value ($K_3$) output from the first logic unit 218 and the first value ($K_2$) stored in data store 211. The second logic unit 219 combines them to generate the initial key. In another embodiment, key generator 217 could generate a different combination of the first and second values ($K_2$ and $K_3$) that would permit the first and second devices to choose the same seed value for the first and second challenges, for example, the initial key could be calculated as the hash value of the first value combined with the second value h The initial key could be used as an encryption key to protect the shared communication signals or a bus that connects the devices, for a keyed hash or keyed message authentication code, or used to derive keys for both encryption and integrity operations. For example, the first and second values ($K_2$ and $K_3$) could be combined to form a key encryption algorithm (stream cipher, self-synchronizing stream cipher block cipher, or keyed message authentication codes (MACs)), to seed an asymmetric key generation algorithm, or they could be used to permute signals lines of a bus between the devices. It should be noted that this technique is not specific to any particular communications medium. For example, the communications medium could be the Internet and this technique is used to bind devices (e.g. ICs) located in disparate physical locations.

FIG. 2D is a functional block diagram illustrating cryptographic unit 146 of second device 130 of FIG. 2B for mutually authenticating first device 110 and second device 130 during a subsequent mutual authentication phase, in accordance with an embodiment of the invention. During the subsequent authentication phase, cryptographic unit 116 operates in one of two modes: a challenge generation mode 245 and a challenge verification mode 246. Challenge generation mode 245 and challenge verification mode 246 of second device 130 are similar to challenge generation mode 215 and challenge verification mode 216 of first device 110 as noted by similar reference numbers. However, instead of generating the first challenge, which uses the seed value ($R_1$) of first device 110, challenge generation mode 245 of second device 130 uses the seed value ($R_2$) of second device 130 to generate the second challenge to send to first device 110. As described above, the second challenge includes a second test value ($E_2$), a hash value of a function of the first device's binding PUF value and the second test value ($h(R_1|E_2)$), and a combined value ($h(R_1) \oplus K_3$)). In addition, challenge verification mode 246, which receives the first challenge from first device 110, recovers the first key ($K_2$) to generate the initial key ($K_i = K_2 \oplus K_3$).

Since first device 110 and second device 130 can determine either one of the seed values ($R_1$ or $R_2$), challenge generation modes 215 and 245 can generate the first and second challenges using either one of the seed values ($R_1$ or $R_2$), and challenge verification modes 216 and 246 can generate the initial key using the other one of the seed values ($R_2$ or $R_1$), respectively. It should also be noted that the devices should not both use $h(R_1)$ or $h(R_2)$ because an adversary could then calculate $(h(R_i) \oplus K_2) \oplus (h(R_i) \oplus K_3) = K_2 \oplus K_3$, revealing the initial key ($K_i$).

FIGS. 3A and 3B are flow charts illustrating a process 300 of first device 110 and a process 310 of second device 130 for binding the first device 110 and second device 130, in accordance with an embodiment of the invention. The order in which some or all of the process blocks appear in processes 300 and 310 should not be deemed limiting. Rather, one of ordinary skill in the art having the benefit of the present disclosure will understand that some of the process blocks may be executed in a variety of orders not illustrated.

Referring to FIG. 3A, in a process block 302 during device binding enrollment, binding PUF circuit 105 generates a unique binding PUF that is measured by cryptographic unit 116 of the first device $D_1$. In a process block 304, cryptographic unit 116 acquires the second device's public key ($K_1$) of the public-private key pair, such as from device fingerprint list 115 maintained or certified by a certification authority 120. In one embodiment, the public-private key pair is previously generated by second device 130 according to the RSA (Rivest, Shamir and Adleman) cryptographic algorithm using a seed value generated from the fingerprint PUF value. As depicted in FIG. 1, the public key from the public-private key pair is output from second device 130 via I/O ports 147 to device fingerprint list 115. In a process block 306, cryptographic unit 116 encrypts, the binding PUF value with the public key ($K_1$). In a process block 308, cryptographic unit 116 sends an encrypted message, including the encrypted binding PUF value ($K_1(R_1)$), to second device 130. First device 110 can delete all instances of the binding PUF value (and the seed value) within first device 110 after sending the encrypted binding PUF value to second device 130 (because it can regenerate these later if or when needed).

Referring to FIG. 3B, in a process block 312 during device binding enrollment, fingerprint PUF circuit 136 generate a unique fingerprint PUF that is measured by cryptographic unit 146 of the second device $D_1$. The fingerprint PUF value remains internal to second device 130 and is not transmitted externally. In one embodiment, the binding PUF value is generated in real-time each time it is need and is not stored for future use internally. In a process block 314, cryptographic unit 146 recovers its private key of the public-private key pair using the fingerprint PUF value. In a process block 316, using the private key, cryptographic unit 146 decrypts the encrypted message, including the first device's binding PUF value ($R_1$). In a process block 318, binding PUF circuit 135 generates a unique binding PUF ($R_2$) that is measured by cryptographic unit 146 of second device $D_2$. In a process block 320, cryptographic unit 146 combines the first device's binding PUF value and the second device's binding PUF value to generate helper data ($W_3$) using the first device's binding PUF value ($R_1$) and the second device's binding PUF value ($R_2$). In a process 322, cryptographic unit 146 stores the helper data ($W_3$) in data store 241, and publishes the helper data ($W_3$), for example, in device fingerprint list 115. Cryptographic units 116 and 146 can use the helper data ($W_3$) during subsequent mutual authentication phases.

The above combination of elements and procedures forms a method of enrolling the binding of the two devices, thus forming a means for detection, and the detection capability is a deterrent against insertion of a subversion or substitution of a subverted component by an adversary who wishes to avoid attribution upon subsequent discovery of the subversion or against device tampering.

Figure 4A:
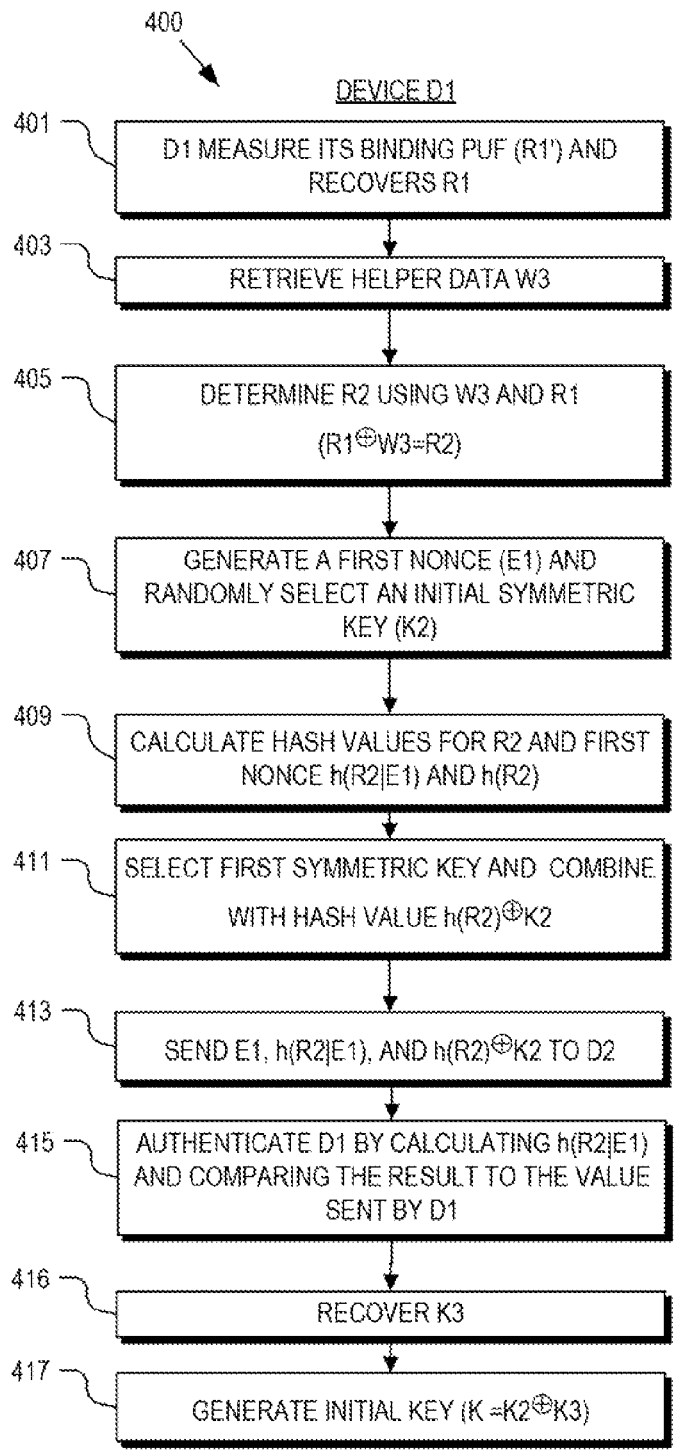
FIG. 4A is a flow chart illustrating a process of a first device for mutually authenticating the first and second devices using mutual challenges, in accordance with an embodiment of the invention.
Figure 4B:
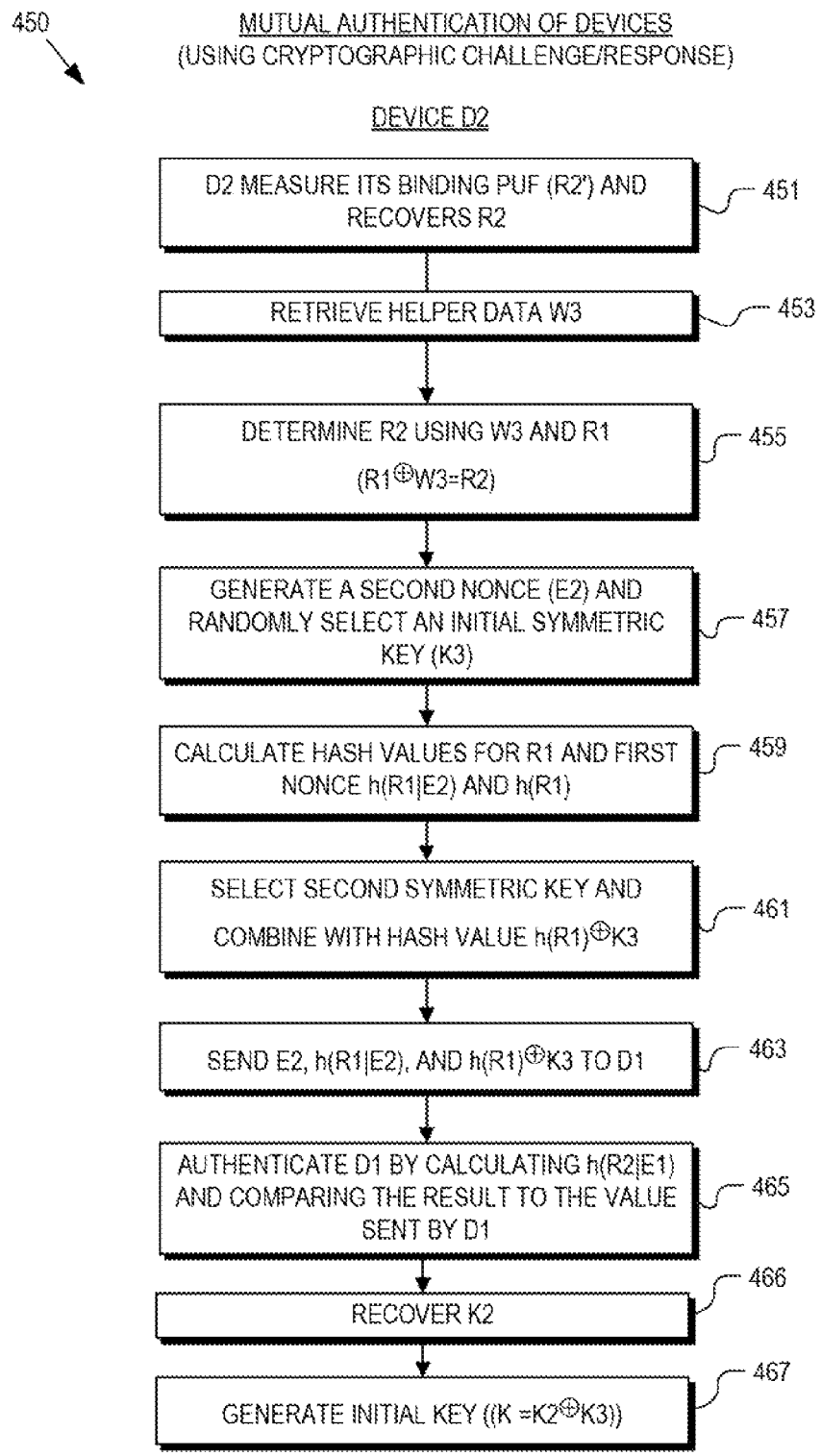
FIG. 4B is a flowchart illustrating a process of a second device for mutually authenticating the first and second devices using mutual challenges, in accordance with an embodiment of the invention.

FIGS. 4A and 4B are flow charts illustrating processes 400 and 450 for mutually authenticating the first and second devices using mutual challenges, in accordance with an embodiment of the invention. The mutual authentication may occur during the deployment phase of the devices using the mutual authentication protocol described below. If either of the devices has changed, then the authentication procedure will fail and appropriate action can be taken by system. For example, the system could raise an alarm or halt. The order in which some or all of the process blocks appear in processes 400 and 450 should not be deemed limiting. Rather, one of ordinary skill in the art having the benefit of the present disclosure will understand that some of the process blocks may be executed in a variety of orders not illustrated.

Referring to FIG. 4A, in a process block 401 during mutual authentication, binding PUF circuit 105 of first device 110 generates a unique binding PUF value ($R_1'$) that is measured by cryptographic unit 116 of the first device $D_1$, and cryptographic unit 116 recovers the binding seed value ($R_1$), for example, performing fuzzy extraction noise reduction. In a process block 403, cryptographic unit 116 retrieves the helper data ($W_3$), published by second device 130. In a process block 405, using the binding seed value and the helper data, cryptographic unit 116 determines the second device's binding seed value ($R_2$). In a process block 407, cryptographic unit 116 generates a test value ($E_1$) or test message for a first challenge. The test value can be a numeric value, an alphanumeric phrase, or a nonce, a random nonce, or the like. In a process block 409, cryptographic unit 116 calculates a hash value for a function of the second device's binding PUF value and the first test value ($h(R_2|E_1)$) and a hash value of the second device's binding PUF value ($h(R_2)$). In a process block 411, cryptographic unit 116 selects a first value ($K_2$) and combines it with the hash value of the second device's seed value ($h(R_2)$) ($h(R_2) \oplus K_2$) to generate a combined value. Cryptographic unit 116 generates the first challenge, which includes the first test value (E1), the hash of the function ($h(R_2|E_1)$), and the combined value. In a process block 413, cryptographic unit 116 sends the first challenge to second device 130. In a process block 415, cryptographic unit 116 receives the second challenge from second device 130 and authenticates second device 130 by calculating verification hash values and comparing the results to the values sent in the second challenge from second device 130. With this verification in place, in process blocks 416 and 417, the cryptographic unit recovers the second value ($K_3$) and generates an initial key using the first value and the second value.

Referring to FIG. 4B, in a process block 451 during mutual authentication, binding PUF circuit 135 of second device 130 generates a unique binding PUF value ($R_1'$) that is measured by cryptographic unit 146 of the second device $D_2$, and cryptographic unit 146 recovers the binding seed value ($R_1$), for example, performing fuzzy extraction. In a process block 453, cryptographic unit 146 retrieves the helper data ($W_3$), such as from data store 241. In a process block 455, using the binding seed value ($R_2$) and the helper data, cryptographic unit 146 determines the second device's binding seed value ($R_2$). In a process block 457, cryptographic unit 146 generates a second test value ($E_2$) (or a test message) for the second challenge. The test value can be a numeric value, an alphanumeric phrase, a nonce, a random nonce, or the like. In a process block 459, cryptographic unit 146 calculates a hash value for a function of the first device's binding PUF value and the second test value ($h(R_1|E_2)$) and a hash value of the first device's binding PUF value ($h(R_1)$). In a process block 461, cryptographic unit 146 selects a second value ($K_3$) and combines it with the hash value of the first device's seed value (h($R_1$)) to generate a combined value (h($R_1$)⊕$K_3$). Cryptographic unit 146 generates the second challenge, which includes the second test value ($E_2$), the hash of the function (h($R_1|E_2$)), and the combined value. In a process block 463, cryptographic unit 146 sends the second challenge to first device 110. In a process block 465, cryptographic unit 146 receives the first challenge from first device 110 and authenticates first device 110 by calculating verification hash values and comparing the results to the values sent in the first challenge from first device 110. Now, each device knows its own PUF and the other device's PUF, as well as the two test values. If the comparison holds, then $D_2$ has proven that it knows $D_1$'s binding PIM, which proves that $D_2$ knows its own binding PUF, which can only happen if $ID_1$ is the device that was initially enrolled with $D_1$. With this verification in place, in process blocks 466 and 467, cryptographic unit 146 recovers the first value ($K_2$) and generates an initial key by combining the second value and the first value.

The above combination of elements and procedures forms a method of mutually authenticating the two devices, thus forming a means for detecting and the detecting capability forms a deterrent against insertion of a subversion or substitution of a subverted component by an adversary who wishes to avoid attribution upon subsequent discovery of the subversion or against device tampering.

Figure 5:
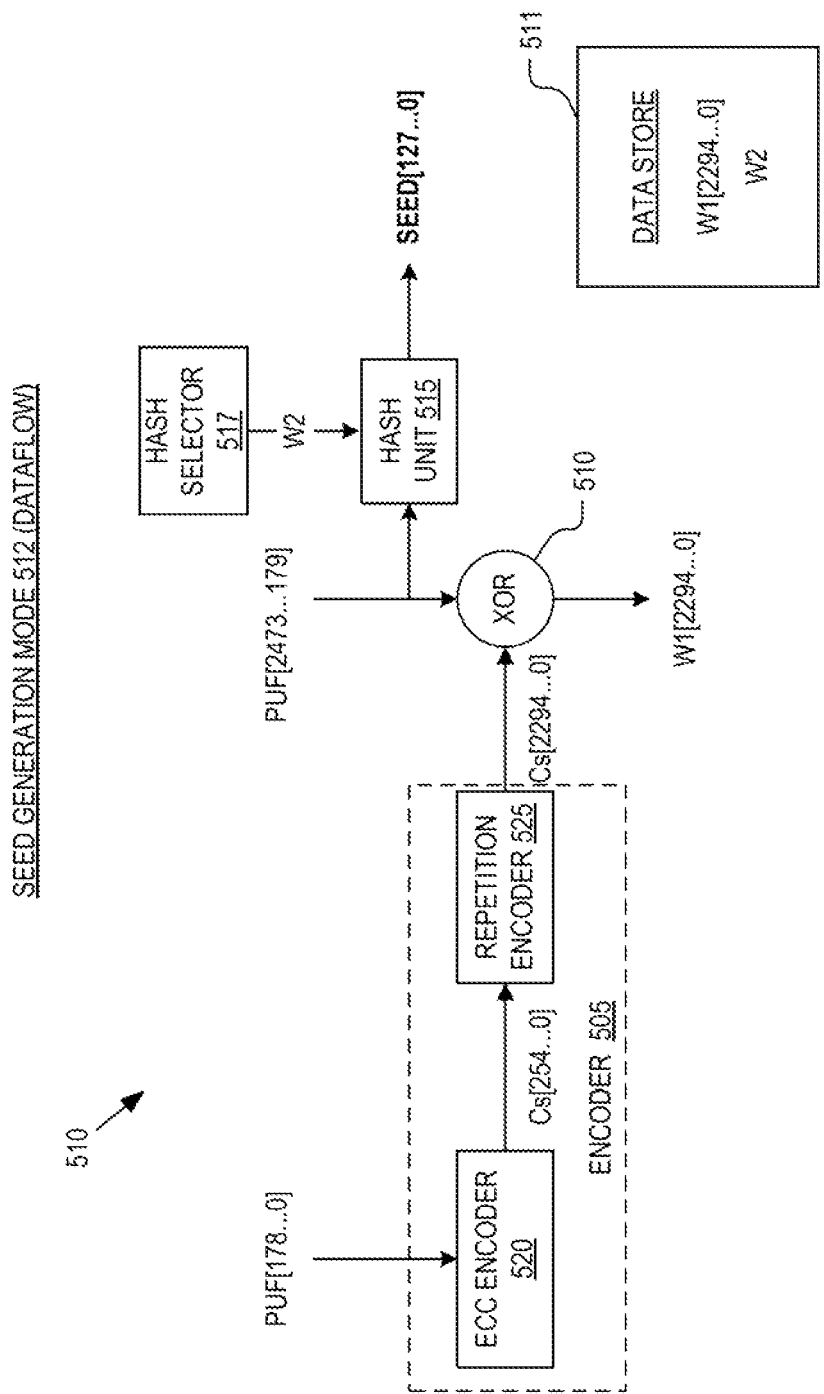
FIG. 5 is a dataflow diagram illustrating a seed generation mode of a noise reduction circuit, in accordance with an embodiment of the invention.

FIG. 5 is a dataflow diagram illustrating a seed generation mode 512 of a noise reduction circuit 510, in accordance with an embodiment of the invention. During seed generation mode 512, noise reduction circuit 510 is configured to include an encoder 505, a logic unit 530, a hash unit 515, a hash selector 517, and data store 511. The illustrated embodiment of encoder 505 includes an ECC encoder 520 and a repetition encoder 525. It should be noted that noise reduction circuit 510 may represent noise reduction circuit 210 of FIGS. 2A and 2C or noise reduction circuit 240 of FIGS. 2B and 2D, and seed generation mode 512 can be seed generation mode 212 of FIG. 2A or seed generation mode 242 of FIG. 2B. Seed generation mode 512 may be used to recover the binding PUF value ($R_1$ or $R_2$) or the fingerprint PUF value ($F_1$ or $F_2$) as described above.

Noise reduction circuit 510 may be configured to operate in seed generation mode 512 by enabling hardware components to implement the dataflow illustrated in FIG. 5, by loading/executing software/firmware modules to implement the dataflow illustrated in FIG. 5, by reconfiguring interconnections between ECC encoder 520, repetition encoder 525, logic unit 530, and hash unit 515 to form the dataflow illustrated in FIG. 5, some combination thereof, or otherwise. Each component illustrated in FIG. 5 may be implemented entirely in hardware, entirely in software, or a combination of both.

In the illustrated embodiment, noise reduction in the noisy PUF value (binding or fingerprint PUF values) is achieved via application of error correction techniques to the PUF value so that future bit errors in the PUF value can be identified and corrected to generate a reliable, consistent seed value. A variety of ECC techniques may be applied (e.g., Reed-Solomon, repetition, Hamming, low-density parity-check (LDPC), etc); however, in one embodiment, ECC encoder 520 is implemented using a BCH (Bose, Chaudhuri, Hocquenghem) encoder to generate an error correcting codeword Cs. To ensure security and prevent an adversary from reverse generating the seed value, the codeword Cs should be selected randomly. Accordingly, in one embodiment, a first portion of the PUF value itself is used to generate the codeword Cs during seed generation mode 512.

During operation of seed generation mode 512, the binding logic 530 is enabled, and the output value of the PUF circuit 105 is measured. A first portion of the PUF value PUF[178 . . . 0] is provided to encoder 505 while a second portion of the PUF value PUF[2473 . . . 179] is provided to logic unit 530 and hash unit 515. ECC encoder 520 uses the first portion PUF[178 . . . 0] to generate the codeword Cs[254 . . . 0]. The codeword is expanded using repetition encoder 525 to generate codeword Cs[2294 . . . 0]. Although FIG. 5 illustrates the use of a 255-bit codeword and a 9× repetition encoder, longer or shorter codewords and higher or lower repetition encoders may be used according to the level of noise in the PUF value. Alternatively, encoder 705 may include only a repetition encoder, or only an ECC encoder. It should be noted that one technique for improving error correcting ability is to concatenate codes, such as by a concatenation of a strong code (such as BCH) and weak code (such as repetition) as described in connection with FIG. 5, but other techniques may be used. Similarly, although FIG. 5 illustrates a 2474-bit PUF value, longer or shorter PUF values may be used according to the desired strength of security. Repetition encoder 525 may be replaced by other types of encoders as well, or omitted entirely.

Logic unit 530 combines the second portion of the PUF value PUF[2473 . . . 179] with the codeword Cs[2294 . . . 0] to generate helper data $W_1$[2294 . . . 0]. In the illustrated embodiment, logic unit 530 uses an XOR function to combine the two values, though other logic functions may be implemented. The helper data $W_1$[2294 . . . 0] is a value, which is used during seed recovery mode 213 to regenerate the seed value SEED[127 . . . 0] generated during seed generation mode 512, but the helper data cannot easily be leveraged to surreptitiously reverse engineer the codeword Cs[2294 . . . 0]. Hash unit 515 hashes the second portion PUF[2473 . . . 179] to generate the fixed length seed value SEED[127 . . . 0]. Hash unit 515 performs a function known as "privacy amplification" or "entropy amplification" since the entropy per bit in the PUF[2473 . . . 179] will be less than one. In one embodiment, the width of the PUF value input into hash unit 515 and the width of the seed value output from hash unit 515 are engineered to compensate for average deficiency in entropy rate in the inter-device variability of the PUF measurements.

In one embodiment, for added security the particular hash algorithm is also selected from a large set of hash algorithms, in which case, helper data $W_2$ indicating the particular hash algorithm selected is also stored into data store 511 (which could be data store 211 or 241). In one embodiment, hash selector 517 generates $W_2$ to implement a randomized selection of the hash algorithm. In one embodiment, hash selector 517 uses a portion of the PUF value to randomly select a particular hash algorithm from a LFSR hash. In one embodiment, hash selector 517 includes an LFSR hash coupled to receive a portion of the PUF value. The output of the LFSR hash is then coupled into an irreducible polynomial generator, which outputs the $W_2$ value for selecting the hash algorithm. In yet another embodiment, hash selector 517 includes a random number generator coupled to an irreducible polynomial generator to generate $W_2$.

Figure 6:
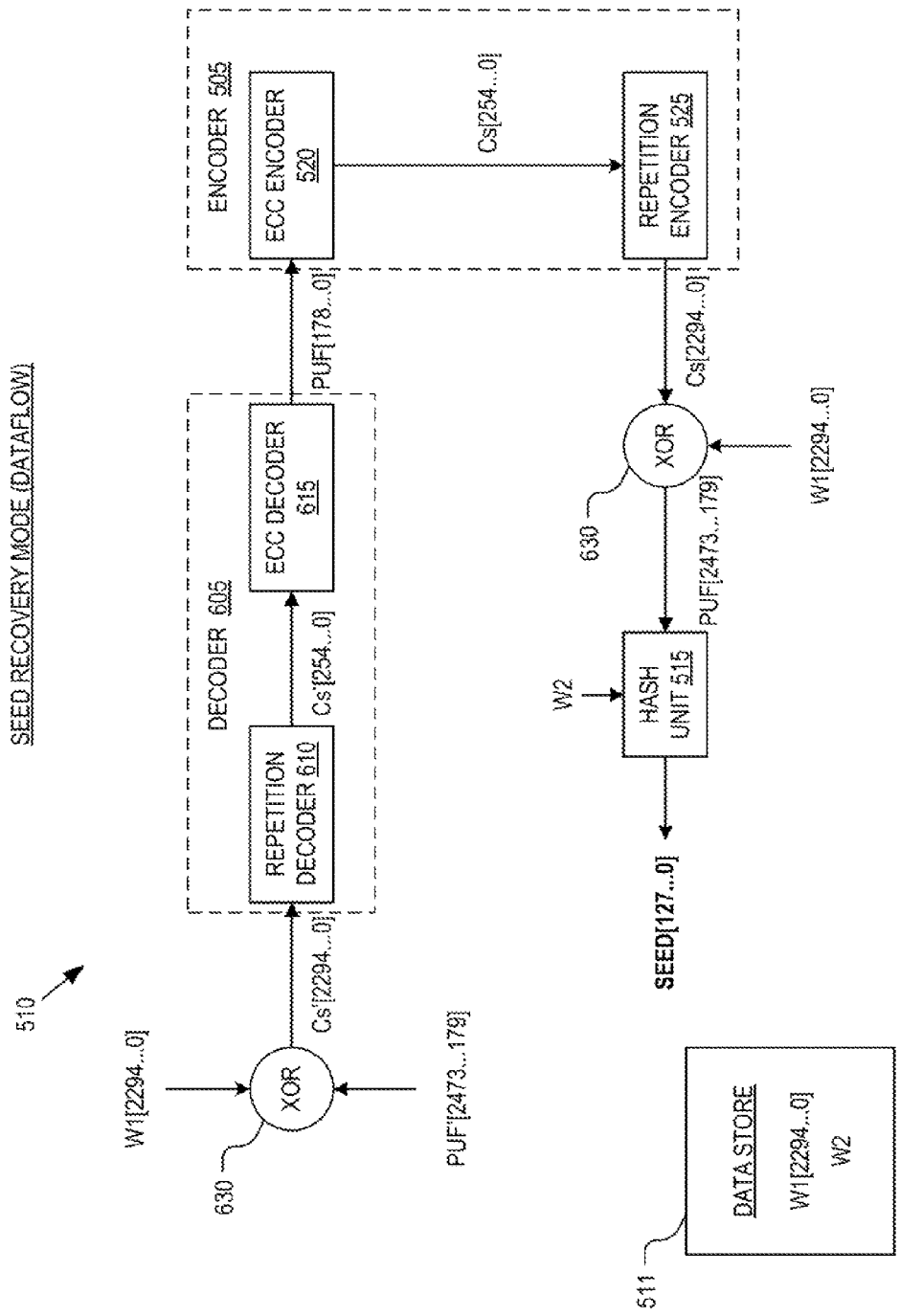
FIG. 6 is a dataflow diagram illustrating a seed recovery mode of a noise reduction circuit, in accordance with an embodiment of the invention.

FIG. 6 is a dataflow diagram illustrating a seed recovery mode 613 of noise reduction circuit 510, in accordance with an embodiment of the invention. During seed recovery mode 613, noise reduction circuit 510 is configured to include two logic units 630, a decoder 605, encoder 505, and hash unit 515. The illustrated embodiment of decoder 605 includes a repetition decoder 610 and an ECC decoder 615. It should be noted that seed recovery mode 613 can be seed recovery mode 213 of FIG. 2A or seed recovery mode 243 of FIG. 2B. Seed recovery mode 613 may be used to recover the binding PUF value ($R_1$ or $R_2$) or the fingerprint PUF value ($F_1$ or $F_2$) as described above.

Noise reduction circuit 510 may be configured to operate in seed recovery mode 613 by enabling hardware components to implement the dataflow illustrated in FIG. 6. The dataflow illustrated in FIG. 6 may be achieved by loading/executing software/firmware modules, by reconfiguring interconnections between the components, some combination thereof, or otherwise. Each component illustrated in FIG. 6 may be implemented entirely in hardware, entirely in software, or a combination of both.

During operation of seed recovery mode 613, binding logic 630 is enabled and receives the PUF value from the PUF circuit. Since the PUF value may be a noisy value, the measured value may not be identical to the original PUF value measured during seed generation mode 512, and thus, the PUF value may not be identical to the original PUF value generated during seed generation mode 512. Accordingly, the subsequently measured PUF value is labeled as PUF' and the error correcting codeword generated based on PUF' is labeled as Cs' in FIG. 6.

A first portion of the PUF' value PUF[2473 . . . 179] is combined by logic unit 630 with the helper data $W_1$[2294 . . . 0] to generate the codeword Cs[2294 . . . 0]. If PUF' happens to be identical to PUF, then Cs' would be equal to Cs. However, if PUF' is a noisy value with at least one flipped bit, then PUF' does not equal PUF and error correcting techniques will remove the errors and regenerate the original PUF value PUF[2473 . . . 179] and the original seed value SEED[127 . . . 0].

Repetition decoder 610 decodes Cs'[2294 . . . 0] down to Cs[7254 . . . 0], which is input into ECC decoder 615 to generate the original PUF[178 . . . 0]. With the original first portion of the PUF value in hand, PUF[1178 . . . 0] is inserted back into encoder 505 to generate the original codeword Cs[2294 . . . 0]. With Cs[2294 . . . 0] in hand, logic unit 630 is once again used to combine Cs[2294 . . . 0] with helper data $W_1$[2294 . . . 0] stored in data store 511 to regenerate the original second portion of the PUF value PUF[2473 . . . 179]. Finally, hash unit 515 uses the second portion of the PUF value to recreate the original seed value SEED[127 . . . 0]. If a fixed hash algorithm is not used, then helper data $W_2$ is retrieved from data store 511 to select the appropriate hash algorithm.

As described herein, the initial key generated by hardware devices 110 and 130 could be used as an encryption key to protect the shared communication signals or a bus that connects devices 110 and 130. For example, the initial key could be used for an encryption key, for a keyed hash or keyed message code, or used to derive keys for both encryption and authentication. In one embodiment, the first and second values, $K_2$ and $K_3$, could be combined to form an initial key for a symmetric encryption algorithm (stream cipher or block cipher), or they could be used to permute the bus as described below. Block ciphers, stream ciphers, or public key cryptography may be used for securing the communication channel(s). The key could be used to permute the signal lines of the communication bus. For example, arbitrary bit permutations can be implemented with Benes networks using only multiplexors. This may permit area, time, and power efficient protection of the channel. The strength of the permutation scales with the size of the bus; for an n bit bus the probability of correctly guessing the permutation is approximately 1/n!. In another embodiment, a system may not necessarily require strong security on the channel if instead the keys are updated frequently. Note that these techniques are not specific to any particular communications medium. For example, the communications medium could be the Internet and this technique used to bind devices located in disparate physical locations.

In one embodiment where a block cipher is used as the symmetric encryption algorithm, chaining modes, such as cipher block chaining (CBC), cipher feedback mode (CFB), output feedback mode (OFB), or counter mode (CTR) may be used to prevent replay attacks. In another embodiment where a stream cipher is used, the cipher is rekeyed frequently enough that the keystream does not repeat. If the stream cipher is self-synchronizing, then a timestamp, counter, or similar source of freshness may be included.

In one embodiment, verification of the first and second challenges, such as in challenge verification modes 216 and 246, provide an initial check on the hardware device binding, and subsequently, the successful decryption of bus data exchanged between $D_1$ and $D_2$ provides confidentiality of data on the bus between the devices $D_1$ and $D_2$. If sufficient redundancy is exchanged so that the devices $D_1$ and $D_2$ can differentiate between valid data and random data that might result from improper decryption, the successful decryption also provides a continuous check of the hardware device binding. This redundancy may be exchanged in the form of MACs or simple cyclic redundancy checks (CRC) over the plaintext to be communicated over the encrypted channel, for example. If confidentiality of data communicated over the channel is not necessary, then the initial key can be used for a keyed MAC. In either case, the ability for each hardware device to check the integrity of messages received from the other device allows the hardware devices (e.g., ICs) to continuously authenticate one another.

Figure 7:
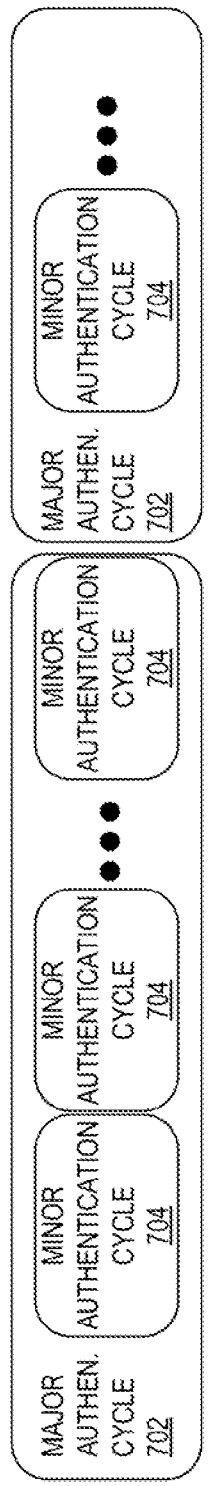
FIG. 7 illustrates major authentication cycles and minor authentication cycles of a hardware device binding, in accordance with an embodiment of the invention.

FIG. 7 illustrates major authentication cycles 702 and minor authentication cycles 704 of a hardware device binding, in accordance with an embodiment of the invention. Major authentication cycles 702 may include performing the binding algorithm described above, while minor authentication cycles 704 may include only an unauthenticated key exchange between the devices. The frequency of the cycles can be adjusted according to the needs of the system. The initial (authenticated) key exchange procedure described above may be considered a major authentication cycle in the sense that the key exchange is protected by the strength of the public key algorithm used during the enrollment and the physical protections provided by the PUFs. Major authentication cycles 702 can be interspersed with minor authentication cycles 704, as shown in FIG. 7. Minor authentication cycles 704 may include a key exchange using, for example, unauthenticated Diffie-Hellman or elliptic curve Diffie-Hellman key exchange. Note that the key exchange during minor authentication cycles 704 can employ unauthenticated key exchange algorithms since the communications between the devices occurs over an authenticated channel.

The frequency of the major and minor authentication cycles should be chosen based on the needs of the system (e.g., acceptability of latency, communications overhead and power consumption for key exchange, area, latency, and power available for authentication code and encryption or scrambling circuit) and the strength of the integrity and encryption or scrambling used to protect the communications channel. For example, a relatively weak algorithm can be used to protect the channel if the key is updated frequently.

Figure 8:
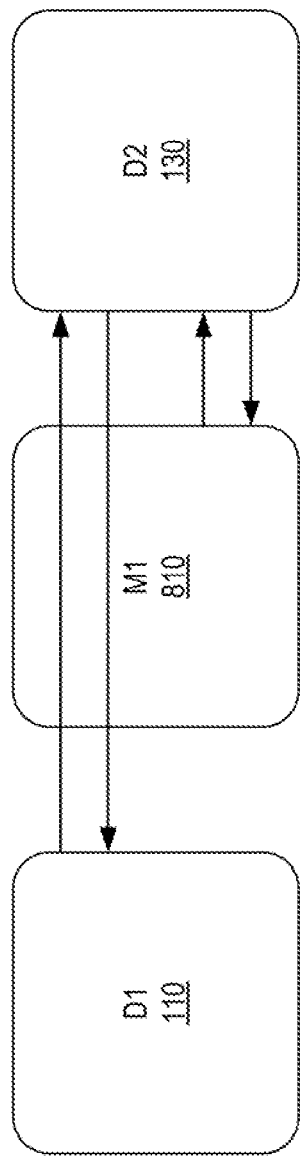
FIG. 8 illustrates a man-in-the-middle attack when a communication channel is not protected, in accordance with an embodiment of the invention.

Major authentication cycles 702 authenticate the hardware devices to one another at a single point in time. The redundancy applied to the encrypted communications on this channel between the hardware devices may extend this point-in-time authentication to continuous authentication. This may be important, in that if the communication channel is not protected, then a simple man-in-the-middle attack could defeat the system as illustrated in FIG. 8. FIG. 8 shows that a malicious device $M_1$ 810 (e.g., 1C) inserted between the legitimate devices, first device $D_1$ 110 and second device $D_2$ 130, could allow the binding authentication procedure to occur between the hardware devices. After the mutual authentication completes, malicious device $M_1$ 810 can interject messages or replace one of the hardware devices entirely when the communication channel is not secure.

A technique for mutual authentication of two hardware devices is described above. This technique can be expanded to larger collections of hardware devices to enhance the security of systems. For example, this technique can be applied to systems of more than two hardware devices. In one embodiment, a system fingerprint technique can be used when performing system-of-systems binding and fingerprinting.

In one embodiment, the technique described above can be used in system binding of systems having more than two devices. Previous work in hardware device fingerprinting allows a human to validate that an individual hardware device is the same as seen during a prior enrollment phase. Also, as described above, two hardware devices can mutually authenticate one another so that each can validate that it is communicating with the same hardware device that it communicated with during an earlier enrollment phase.

Figure 9:
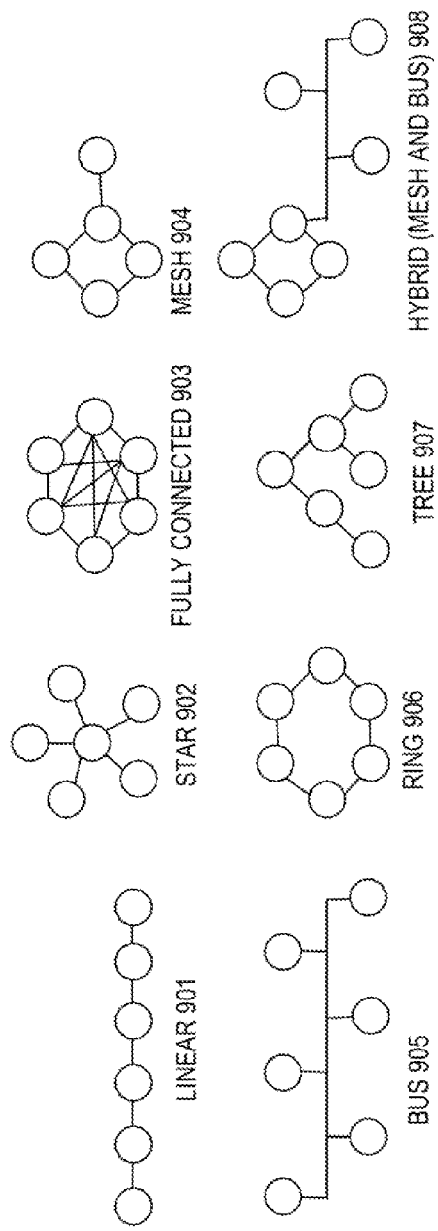
FIG. 9 illustrates eight fundamental network topologies in which embodiments of the present invention may be implemented.

FIG. 9 illustrates eight fundamental network topologies in which embodiments of the present invention may be implemented. In FIG. 9, the network topologies may include point to point communications, including but not limited to a linear topology 901, a star topology 902, a mesh topology 904, a ring topology 906, tree topologies 906, and a fully connected topology 903, as well as a bus topology 905 and a hybrid technology 908, which include channels that are shared by more than two hardware devices. The mesh topology 904 includes at least two nodes that have at least two paths connecting them, while the hybrid topology 908 is a combination of two or more other topologies. Several approaches can be applied to the bus topology 905 and hybrid network topologies 906. In systems with point-to-point communications, the binding procedure described above can be employed on each point-to-point channel. In one embodiment, the same binding PUF is used for each point-to-point channel. In this embodiment, it is possible for hardware devices that are not directly connected to learn each other's binding PUF values. For example, let $D_1$, $D_2$ and $D_3$ be hardware devices with binding PUFs $R_1$, $R_2$, and $R_3$, and let $W_{3,m,n}$ represent the helper data from the enrollment phase of binding algorithm between devices $D_m$ and $D_n$. If device $D_1$ is bound to $D_2$ and $D_2$ is bound to device $D_3$, and if $D_2$ uses the same binding PUF with $D_1$ and $D_3$, then helper data $W_{3,1,2}=R_1 \oplus R_2$ and $W_{3,2,3}=R_2 \oplus R_3$ will both be public. Device $D_1$ can determine $R_2$ from $W_{3,1,2}$. With this it can use $W_{3,2,3}$ to determine the binding PUF of $D_3$. In another embodiment, different binding PUFs are used for each point-to-point channel.

Note that these topologies may require several hardware devices to share a communications channel. There are several approaches to binding devices. In a first approach, each device has a binding PUF for each other device. In a second approach, each device has a single binding PUF that is used with each of the other devices. In a third approach, one of the devices intermediates binding and key exchange for all devices. In the first approach, the system may scale poorly because it may require many binding PUFs in each hardware device. It may also make adding components to the system difficult, since the devices may eventually exhaust their set of binding PUFs. In the second approach, this single PUF is used in the binding algorithm with each of the other devices to eventually settle on the initial key $k_1 \oplus k_2 \oplus \ldots \oplus k_n$. This may have substantial overhead since each device must communicate with every other device. This overhead may be replicated each time the system rekeys. The third approach may ease this overhead by requiring only one device (the root device) to communicate with all of the other devices. In this approach, the initial key is again $k_1 \oplus k_2 \oplus \ldots \oplus k_n$. Rekeying could be accomplished by having each device agree on a shared key with the root device. The root device may combine these into a system key and then communicates the new key to each of the other devices. Alternatively, combinations of these techniques can be applied to hybrid network topologies.

In one embodiment, system fingerprints of a system of multiple devices, much like device fingerprints of a single device, can be used by or computed on behalf of a human to validate that the system is the same as was seen during an earlier enrollment phase. Substitution or modification of any of the devices in the system would be detected. This may be the system level equivalent of prior hardware device fingerprinting work. In this embodiment, a system fingerprinting device $D_{sf}$ that has public key $P_{sf}$ md and associated private key $S_{sf}$ can be used to implement this functionality. Let the other devices in the system be $D_1, D_2, \ldots, D_n$. During an initial enrollment procedure, each of the devices $D_i$ may encrypt its system fingerprint PUF $R_{i,sf}$ (which may or may not be distinct from its binding PUF, but which should be distinct from its own fingerprint PUF) with $P_{sf}$ and communicates the result to $D_{A^-}$. The system fingerprinting device $D_{sf}$ decrypts each of the $R_{i,sf}$ and combines them (XOR, concatenation, or otherwise) with its own system binding PUF (which can be the same PUF that was used to derive $P_{sf}$ and $S_{sf}$). The result is used to seed an asymmetric key generation algorithm to produce a system-level key pair. The public key is stored in a signed list, and the private key is destroyed. During subsequent authentication, as done with hardware device fingerprinting of a single system, a random challenge is selected, encrypted with the system's public key, and sent to the system fingerprinting device. In response, the system fingerprinting device $D_{sf}$ queries each of the devices in the system. The devices then reproduce their system binding PUFs, encrypt them with $P_{sf}$, and send them to the system fingerprinting device $D_{sf}$, which combines them and seeds the key generation algorithm. The resulting private key is used to decrypt the challenge, and the result is returned as the response. If the system has been changed (e.g. one or more hardware devices are replaced or otherwise modified) then the response will be incorrect. In these embodiments, it should be noted that the system's private key does not need to be stored in non-volatile memory, since it can be reproduced, used, and then destroyed each time it is needed. Alternatively, the binding algorithm described above can be used for data exchange during the authentication procedure, eliminating the need for asymmetric cryptographic operations during authentication.

Figure 10A:
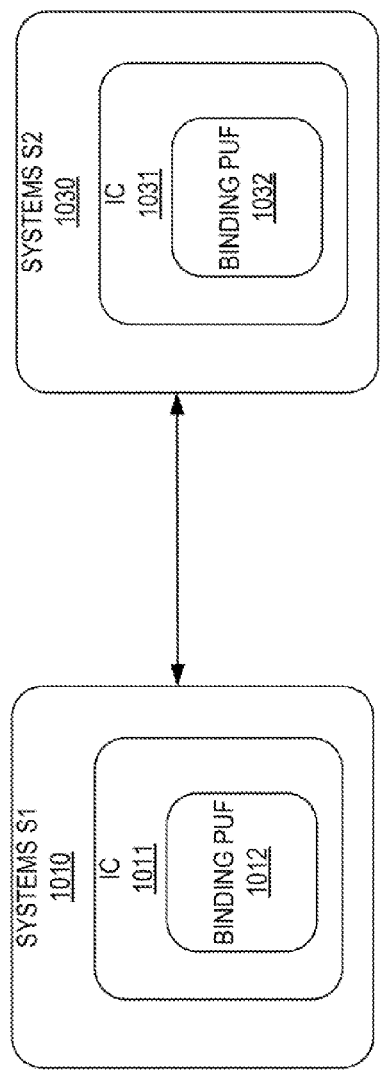
FIG. 10A illustrates a functional block diagram by which distinct systems can communicate binding PUFs, in accordance with an embodiment of the invention.
Figure 10B:
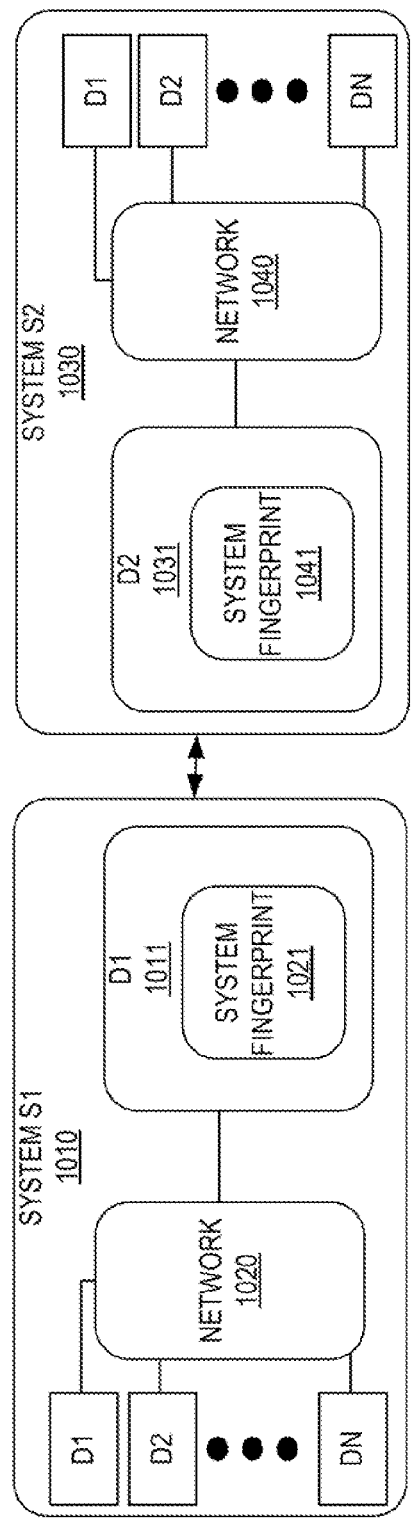
FIG. 10B illustrates a functional block diagram by which distinct systems can communicate fingerprint information, in accordance with an embodiment of the invention.

The embodiments described herein regarding hardware device binding and system fingerprinting can be applied to system-of-systems binding and system-of-systems fingerprinting. FIGS. 10 and 10B illustrate two functional block diagrams by which distinct systems 1010 and 1030 can communicate binding PUFs 1012 and 1032 or fingerprint information 1021 and 1041. In FIG. 10A, system 1010 includes a hardware device 1011 (e.g., IC), which includes a binding PUF 1012, and system 1030 includes a device 1031 (e.g., IC), which includes a binding PUF 1032. Using binding PUFs 1012 and 1032, devices 1011 and 1031 can bind the two systems in a system-of-systems binding. In FIG. 10B, the devices 1011 and 1031 include system fingerprint information 1021 and 1041, respectively. Devices 1011 and 1031 can use fingerprint information 1021 and 1041 in a system-of-systems fingerprinting process by simply using their binding PUFs. In FIG. 10B, some function, e.g. a one-way hash, of the system fingerprints may be used. The embodiment of FIG. 10B incorporates a system-level security value (the system fingerprint), rather than a device-level value (the binding PUF). In FIG. 10B, each system has a system fingerprint that can be used to authenticate the system as a whole. A function of this system fingerprint (e.g. a hash of the private key) can be used as a "system PUF" in the binding algorithm described above. The embodiments of FIGS. 10A and 10B, these techniques may allow the entire systems to be treated as individual nodes in the network topologies described in connection with FIG. 9, after which the system binding and system fingerprinting techniques discussed herein can be applied. This permits system-of-systems binding and system-of-systems fingerprinting. This process can be extended to the desired level of complexity (system-of-system-of-systems, and so forth).

In another embodiment, the binding algorithm of component binding can be used to build self-checking systems. For example, initially, assume the devices (ICs) in a system are endowed with fingerprint PUFs and binding PUFs. Each device's fingerprint PUF is queried during an initial device authentication, and then the system is built from these devices. After the system is built, the fingerprint PUFs can be queried again. The fingerprint PUFs could be queried for the first time after the devices are integrated into the system. In another embodiment, the fingerprint PUFs can be queried before and after integrating them into the system. Next, the devices within the system are enrolled with one another using the binding algorithm described herein. Then on power-up, the devices mutually authenticate one another. If any of the bound devices have been modified or substituted for different devices then the authentication process will fail in an at least one of the devices, and the system can respond appropriately. The appropriate response may be system dependent, but may include, for example, sounding an alarm, alerting the user, limiting functionality of the system, or halting the system entirely. As the system operates, the devices can continuously authenticate one another by protecting the integrity of messages communicated within the system with keys exchanged during the initial major authentication cycle, and the major authentication cycle can be repeated periodically as described above in connection with FIG. 7. Additionally, some designers may choose to eliminate the message integrity checks; this opens the system to man-in-the-middle attacks as described above in connection with FIG. 8, but may be acceptable under certain threat scenarios.

It should be noted that this binding technique is intended to prevent unintended modifications to systems. However, it may be important that authorized changes to the system can be made. For example, it may be necessary to upgrade hardware devices or to replace damaged hardware devices. System upgrades can be accomplished by repeating the enrollment procedure to bind the new devices to the existing devices. However, this procedure should be protected so that an adversary cannot replace or modify devices in the system and then repeat the enrollment process undetected. One step toward accomplishing this goal may include cryptographically signing the $W_3$ values generated during the enrollment procedure. The keys needed by the devices to verify the signatures could themselves be protected with PUFs, eliminating the need for the devices to store those cryptographic variables in non-volatile memory. In this case, for an adversary to substitute or modify one device in the system with associated binding helper data $W_{3k}$ the adversary would need to 1) replace each device that stores its binding helper data $W_{3i}$ in the same memory as $W_{3k}$; 2) repeat the binding enrollment process for each of these devices; and 3) replace all of the $W_{3i}$ values stored in the same memory as $W_{3k}$ with values signed with the adversary's key which may be substantially more difficult than replacing or modifying a single device. Even if this is accomplished, a human attempting to authenticate the devices with a fingerprinting challenge-response will detect the modification or substitution.

Silicon PUFs can be broadly categorized as delay based and memory based. Delay based PUFs, such as a ring oscillator PUF and an arbiter, measure the difference in delay through "identical" circuits. Memory based PUFs exploit variations in memory structures, such as cross-coupled logic gates and latches and SRAM cells. Various examples of different silicon PUF circuits include, but are not limited to arbiter type PUFs, ring oscillator type PUFs, cross-coupled type PUFs, and butterfly type PUFs, described briefly below. Other PUFs can be used, for example, optical coating PUFs, magnetic PUFs, etc. Alternatively, other types of PUFs may be suitable, as long as a given PUF design has sufficiently small intra-device variation and sufficiently large inter-device variation given a desired level of security. For example, intrinsic PUFs, which are created from a resource that already exists on a chip may be used. In the case of FPGAs, the startup values of SRAM and flip-flops may be leveraged. The primary advantage of intrinsic PUFs is that they are already present on the FPGA, and so only a readout circuit is needed to obtain the value of the PUF. In this sense, fewer FPGA resources are required to implement the function. However, in some cases it may be difficult to read the value of an intrinsic PUF, since SRAM and flip-flop states on FPGAs are commonly forced into a known state upon power up. As such, modification of the bit stream loaded into the FPGA may be necessary for readout.

An arbiter type PUF has multiple stages, each stage is a switch circuit that may include a pair of two input multiplexers with a shared select signal (SEL). A pulse is presented to the inputs at the first stage, and the signal races along the two paths in the subsequent stages, switching between the lower and upper paths as determined by the SEL input at each stage. When one of the inputs arrives first, the output is '0," and when the other input arrives first, the output is '0.' The arbiter type PUF generates a challenge-response pair, where the challenge is the input, or sequence of inputs, and the response is the output or sequence of outputs; the PUF output is the response to the a particular input challenge.

A ring oscillator type PUF exploits variations in the resonance frequencies of a set of identical ring oscillators. To produce an output bit, the resonance frequencies of the ring oscillators are compared and the output bit is determined by which oscillator is fastest. A k bit sequence is produced by making k comparisons between multiple different ring oscillators.

The cross-coupled PUF type uses a positive feedback loop to store a bit. Without applying any external stimulus, the output of cross-coupled PUF will attain a stable output. The value of this output results from differences in interconnect delay and the voltage transfer characteristics of the inverters. A k bit sequence can be obtained from k cross-coupled inverter pairs. Other logic gates, such as NAND and NOR gates, can also be connected in a cross-coupled configuration to be used as a PUF.

The butterfly type PUF may include cross-coupled D latches, having enable inputs (E) that are tied high so that the D input is always transferred to the Q output. To operate the circuit as a PUF, "in" is set to '1', which causes the active high "clr" and "pre" signals to set Q1='0', Q2='1'. Since the latches are cross-coupled, this forces $D_1$='1' and $D_2$='0'. These inputs are ignored while "in" is asserted. Next, "in" is set to '0', which causes the system to enter an unstable state. At this point, the positive feedback loop and differences in wire and latch propagation delays force the output to a stable value. As with the cross-coupled PUF, k bits are generated by implementing k butterfly PUFs within a given device.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (e.g., stores) information in a form accessible by a machine (e.g., a computer, network device, personal digital assistant, manufacturing tool, any device with a set of one or more processors, etc.). For example, a computer-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for cryptographically authenticating hardware devices, the method comprising:
    retrieving helper data, wherein the helper data is previously generated during an enrollment of the first device and a second device of the hardware devices, wherein the helper data is generated using a first hardware identifier of the first device and a second hardware identifier of the second device;
    extracting the second hardware identifier using the helper data and the first hardware identifier;
    generating a first challenge using the second hardware identifier;
    sending the first challenge to the second device of the hardware devices;
    receiving a second challenge, wherein the second challenge is generated by the second device using the first hardware identifier;
    verifying the second challenge using the first hardware identifier;
    periodically re-authenticating the second device as major authentication cycles; and
    periodically performing a key exchange as minor authentication cycles.

2. The method of claim 1, further comprising recovering a first binding physically unclonable function ("PUF") value from a first PUF circuit disposed on or within the first device as the first hardware identifier, and wherein the second hardware identifier, extracted from the helper data, is a second binding PUF value generated by a second PUF circuit disposed on or within the second device.

3. The method of claim 2, wherein said generating the first challenge comprises:
    generating a first test value;
    selecting a first value;
    calculating a hash value for the second binding PUF value;
    calculating a hash value of a function of the second binding PUF value and the first test value; and
    combining the hash value for the second binding PUF value with the first value to generate a combined value, wherein said sending the first challenge comprises sending the first test value, the hash value of the function of the second binding PUF value and the first test value, and the combined value.

4. The method of claim 2, wherein the second challenge comprises a second test value, a hash value of a function of the first binding PUF value and the second test value, and a combined value of the hash value of the first binding PUF value and a second value, and wherein said verifying the second challenge comprises:
    calculating a verification hash value of a function of the first binding PUF value and the second test value; and
    comparing the verification hash value with the hash value of the function of the first binding PUF value and the second test value received as part of the second challenge from the second device, wherein the second device is authenticated when the verification hash value matches the hash value of the function of the first binding PUF value and the second test value received as part of the second challenge.

5. The method of claim 4, further comprising:
    when the verification hash value matches the hash value of the function of the first binding PUF value and the second test value received as part of the second challenge, calculating the second value; and
    combining the first value and the second value to generate an initial key.

6. The method of claim 5, further comprising using the initial key as an encryption key in a symmetric encryption algorithm.

7. The method of claim 5, further comprising using the initial key for at least one of a keyed hash or a keyed message authentication code for subsequent authentication of data between devices.

8. The method of claim 5, further comprising using the initial key to permute signal lines of a bus to which the first device and the second device are coupled.

9. The method of claim 5, further comprising using the initial key to generate a public-private key pair.

10. A computing device, comprising:
    a hardware platform;
    a cryptographic unit, disposed in or on the hardware platform for binding and mutually authenticating the computing device to a second computing device, the cryptographic unit comprising:
        a first physically unclonable function ("PUF") circuit disposed in or on the hardware platform, the first PUF circuit coupled to output a first binding PUF value, wherein the cryptographic unit is configured to send the first binding PUF value to the second computing device over a communication channel, and to receive helper data over the communication channel from the second computing device to bind the computing device and the second computing device, wherein the helper data is generated by the second computing device using the first binding PUF value and a second binding PUF value generated using a second PUF circuit disposed on or within the second computing device, and wherein the cryptographic unit comprises an encryptor coupled to encrypt the first binding PUF value with a public key of the second computing device before sending the first binding PUF value to the second computing device; and a noise reduction circuit coupled between the first PUF circuit and the encryptor, the noise reduction circuit coupled to receive the first binding PUF value, to reduce uncertainty in the first binding PUF value, and to output a seed value to the encryptor based on the first binding PUF value, and wherein the noise reduction circuit includes a seed generation mode to generate the seed value, and a seed recovery mode to re-create the seed value.

11. The computing device of claim 10, wherein the cryptographic unit includes a challenge generation mode, wherein during the challenge generation mode the cryptographic unit comprises:

a first logic unit to combine the first binding PUF value and the helper data to generate the second binding PUF value;

a hash unit coupled to the first logic unit to receive the second binding PUF value and to generate a hash value for the second binding PUF value, a hash value of a function of the second binding PUF value and a first test value; and a second logic unit to combine a first key with the hash value of the second binding PUF value to generate a combined value, wherein the cryptographic unit is configured to generate a first challenge including the first test value, the hash value of the function of the second binding PUF value and the first test value, and the combined value, and to send the first challenge to the second computing device over the communication channel.

12. The computing device of claim 10, wherein the cryptographic unit includes a challenge verification mode, wherein during the challenge verification mode the cryptographic unit comprises:

a hash unit coupled to receive the first binding PUF value and to generate a hash value for the first binding PUF value, and a verification hash value of a function of the first binding PUF value and a second test value;

a comparison unit coupled to receive the verification hash value and a hash value of a function of the first binding PUF value and the second test value received as part of a second challenge generated by the second computing device; and a key generator coupled to generate an initial key when a comparison by the comparison unit is a match, wherein the key generator is configured to generate the initial key using the hash value of the first binding PUF value, a combined value of the hash value for the first binding PUF value and a second key received as part of the second challenge.

13. A computing device, comprising:
a hardware platform; and
a cryptographic unit for binding and mutually authenticating the computing device to a second computing device, the cryptographic unit comprising:
one or more PUF circuits disposed in or on the hardware platform, wherein the one or more PUF circuits coupled to output a first binding PUF value, and wherein the one or more PUF circuits are coupled to output a fingerprint PUF value;

a combining circuit coupled to receive the first binding PUF value and a second binding PUF value, received from the second computing device, and to generate helper data using the first and second binding PUF values, and wherein the combining circuit is coupled to output the helper data for mutual authentication of the binding of the computing device and the second computing device;

a key generator coupled to generate a private key of a public-private key pair based on the fingerprint PUF value;

a decryptor coupled to receive a message, including a second binding PUF value encrypted with a public key of the public-private key pair, from the second computing device, and coupled to output the second binding PUF value decrypted with the private key; and a noise reduction circuit coupled between the second PUF circuit and the key generator, the noise reduction circuit coupled to receive the fingerprint PUF value, to reduce uncertainty in the fingerprint PUF value, and to output a seed value to the key generator based on the fingerprint PUF value.

14. The computing device of claim 13, further comprising a noise reduction circuit coupled between the first PUF circuit and the combining circuit, the noise reduction circuit coupled to receive the first binding PUF value, to reduce uncertainty in the first binding PUF value, and to output a seed value to the combining circuit based on the first binding PUF value.

15. The computing device of claim 13, wherein the cryptographic unit includes a challenge generation mode, wherein during the challenge generation mode the cryptographic unit comprises:

a first logic unit to combine the first binding PUF value and the helper data to calculate or recover the second binding PUF value;

a hash unit coupled to the first logic unit to receive the second binding PUF value and to generate a hash value for the second binding PUF value, a hash value of a function of the second binding PUF value and a first test value; and a second logic unit to combine a first key with the hash value of the second binding PUF value to generate a combined value, wherein the cryptographic unit is configured to generate a first challenge including the first test value, the hash value of the function of the second binding PUF value and the first test value, and the combined value, and to send the first challenge to the second computing device over a communication channel.

16. The computing device of claim 13, wherein the cryptographic unit includes a challenge verification mode, wherein during the challenge verification mode the cryptographic unit comprises:

a hash unit coupled to receive the first binding PUF value and to generate a hash value for the first binding PUF value, and a verification hash value of a function of the first binding PUF value and a second test value;

a comparison unit coupled to receive the verification hash value and a hash value of a function of the first binding PUF value and the second test value received as part of a second challenge generated by the second computing device; and a second key generator coupled to generate an initial key when a comparison by the comparison unit is a match, using the hash value of the first binding PUF value, a combined value of the hash value for the first binding PUF value and a second key received as part of the second challenge.

\* \* \* \* \*